(12) United States Patent
Olsen

(10) Patent No.: US 7,426,970 B2
(45) Date of Patent: Sep. 23, 2008

(54) ARTICULATED WHEEL ASSEMBLIES AND VEHICLES THEREWITH

(76) Inventor: Christopher J. Olsen, 12 Browns Rd., Walden, NY (US) 12586

( * ) Notice: Subject to any disclaimer, the term of this patent is extended or adjusted under 35 U.S.C. 154(b) by 75 days.

(21) Appl. No.: 11/617,881

(22) Filed: Dec. 29, 2006

(65) Prior Publication Data

US 2007/0152427 A1 Jul. 5, 2007

Related U.S. Application Data

(63) Continuation of application No. PCT/US06/62107, filed on Dec. 14, 2006.

(60) Provisional application No. 60/755,625, filed on Dec. 30, 2005.

(51) Int. Cl.
| | |
|---|---|
| B60K 1/00 | (2006.01) |
| B62B 9/00 | (2006.01) |
| B62B 3/00 | (2006.01) |
| B62D 21/14 | (2006.01) |
| B62D 33/08 | (2006.01) |
| B62D 61/12 | (2006.01) |

(52) U.S. Cl. .......... 180/65.1; 180/65.5; 180/907; 180/908; 280/638; 280/642; 280/647; 280/650; 280/657; 280/658; 280/43; 280/43.16; 280/43.17; 280/43.22; 280/43.23

(58) Field of Classification Search .......... 280/638, 280/642, 647, 650, 657, 658, 43, 43.16, 43.17, 280/43.22, 43.23; 180/65.1, 65.5, 907, 908
See application file for complete search history.

(56) References Cited

U.S. PATENT DOCUMENTS

| | | | |
|---|---|---|---|
| 978,161 | A | 12/1910 | Holmes |
| 2,750,204 | A * | 6/1956 | Ohrmann .......... 280/755 |
| 2,843,426 | A | 7/1958 | Nojima |
| 3,260,324 | A | 7/1966 | Suarez |

(Continued)

OTHER PUBLICATIONS

Bell, David A., "The NavChair Assistive Wheelchair Navigation System", *IEEE Transactions on Rehabilitation Engineering*, vol. 7, No. 4, Dec. 1999, pp. 443-451.

(Continued)

*Primary Examiner*—Christopher Ellis
*Assistant Examiner*—John R Olszewski
(74) *Attorney, Agent, or Firm*—Woodard, Emhardt, Moriarty, McNett & Henry LLP

(57) ABSTRACT

The disclosed articulated wheel assemblies and associated vehicles, for example wheelchairs, include articulated wheel assemblies with at least one offset connecting arm rotatably attached at one end to a payload platform, for example a seat, and attached at the other end to a linear actuator, where the linear actuator is further connected to a wheel. Embodiments include a rotary actuator for varying the linear actuator swing angle, a rotary actuator for eccentrically rotating a hubless wheel, a linear actuator motor for varying the length of the linear actuator, and a propulsion motor. Embodiments provide omnidirectional motion, stepping action when presented with obstacles, irregular surface negotiation, tight space maneuvering and other features to provide disabled people increased mobility. Alternate embodiments include a payload platform with a support strut, which is rotatably attached to an offset connecting arm and pivotally mounted to a seat.

20 Claims, 22 Drawing Sheets

U.S. PATENT DOCUMENTS

| | | | |
|---|---|---|---|
| 3,306,390 | A | 2/1967 | Jamme |
| 3,572,458 | A | 3/1971 | Tax |
| 3,842,926 | A | 10/1974 | Williams et al. |
| 3,899,037 | A | 8/1975 | Yuker |
| 4,119,163 | A | 10/1978 | Ball |
| 4,265,326 | A | 5/1981 | Lauber |
| 4,266,627 | A * | 5/1981 | Lauber .................... 180/8.3 |
| 4,363,493 | A | 12/1982 | Veneklasen |
| 4,512,588 | A | 4/1985 | Cox |
| 4,519,466 | A | 5/1985 | Shiraishi |
| 4,558,758 | A | 12/1985 | Littman et al. |
| 4,569,409 | A | 2/1986 | Kluth |
| 4,599,030 | A | 7/1986 | Skaalen et al. |
| 4,618,155 | A | 10/1986 | Jayne |
| 4,645,222 | A | 2/1987 | Hester |
| 4,666,170 | A | 5/1987 | Vasa |
| 4,733,737 | A | 3/1988 | Falamak |
| 4,750,751 | A | 6/1988 | Schafer |
| 4,790,548 | A | 12/1988 | Decelles et al. |
| 4,834,409 | A | 5/1989 | Kramer |
| 4,892,323 | A | 1/1990 | Oxford |
| 4,977,971 | A | 12/1990 | Crane, III et al. |
| 5,020,818 | A | 6/1991 | Oxford |
| 5,071,196 | A | 12/1991 | Sbarro |
| 5,149,118 | A | 9/1992 | Oxford |
| 5,248,019 | A | 9/1993 | Sbarro |
| 5,261,684 | A | 11/1993 | Soto |
| 5,308,098 | A | 5/1994 | Shea |
| 5,312,127 | A | 5/1994 | Oxford |
| 5,372,211 | A * | 12/1994 | Wilcox et al. .............. 180/8.2 |
| 5,419,619 | A | 5/1995 | Lew |
| 5,456,332 | A | 10/1995 | Borenstein |
| 5,493,755 | A | 2/1996 | Kindstrand et al. |
| 5,507,513 | A | 4/1996 | Peters et al. |
| 5,515,934 | A * | 5/1996 | Davis ..................... 180/8.2 |
| 5,518,081 | A | 5/1996 | Thibodeau |
| 5,547,038 | A | 8/1996 | Madwed |
| 5,609,216 | A | 3/1997 | Fisher et al. |
| D380,991 | S | 7/1997 | Deming |
| 5,701,965 | A | 12/1997 | Kamen et al. |
| 5,752,710 | A | 5/1998 | Roberts |
| 5,791,425 | A | 8/1998 | Kamen et al. |
| 5,924,512 | A | 7/1999 | Wada |
| 5,927,423 | A | 7/1999 | Wada et al. |
| D413,551 | S | 9/1999 | Wilcox et al. |
| 5,967,348 | A | 10/1999 | Jussila |
| 5,975,225 | A | 11/1999 | Kamen et al. |
| 6,003,624 | A | 12/1999 | Jorgensen et al. |
| 6,109,379 | A | 8/2000 | Madwed |
| 6,112,843 | A | 9/2000 | Wilcox et al. |
| 6,144,180 | A | 11/2000 | Chen et al. |
| 6,241,321 | B1 | 6/2001 | Gagnon |
| 6,267,196 | B1 * | 7/2001 | Wilcox et al. ............... 180/347 |
| 6,302,230 | B1 | 10/2001 | Kamen et al. |
| 6,311,795 | B1 | 11/2001 | Skotnikov et al. |
| 6,343,664 | B2 | 2/2002 | Morrell et al. |
| 6,443,251 | B1 | 9/2002 | Morrell et al. |
| 6,478,099 | B1 | 11/2002 | Madwed |
| 6,491,127 | B1 | 12/2002 | Holmberg et al. |
| 6,530,445 | B1 | 3/2003 | Flowers et al. |
| 6,540,039 | B1 | 4/2003 | Yu et al. |
| 6,810,976 | B2 | 11/2004 | Rohrs |
| 6,839,939 | B2 | 1/2005 | Donakowski |
| 6,853,877 | B1 | 2/2005 | Slater et al. |
| 6,976,696 | B2 * | 12/2005 | O'Krangley et al. ........ 280/640 |
| 7,055,840 | B1 | 6/2006 | Kelso |

OTHER PUBLICATIONS

Borenstein, J, et al., "'Where am I?' Sensors and Methods for Mobile Robot Positioning", University of Michigan, Oak Ridge National Lab (ORNL) D&D Program, Apr. 1996.

Brock, "Parallel All Wheel Steering Wheelchair by NexTek Mobility Corp.", *National Institute of Child Health & Human Development*, Aug. 29, 2006, web address: http://www.nichd.nih.gov/about/org/ncmrr/prog_bsret/paws/index.cfm.

Han, Fuhua, et al., "Construction of an Omnidirectional Mobile Robot Platform Based on Active Dual-Wheel Caster Mechanisms and Development of a Control Simulator", *Journal of Intelligent and Robotic Systems*, 29:2000, pp. 257-275.

Hirose, Y., "Holonomic Omni-Directional Vehicle 'VmaxCarrier'", Hirose Robotics Lab, website: http://www-robot.mes.titech.ac.jp/robot/wheeled/vmax/vmax_e.html.

Killough, Stephen M., "Design of an Omnidirectional and Holonomic Wheeled Platform Prototype", *IEEE*, 1985, pp. 1-16.

Mazo, M. et al., "An Integral System for Assisted Mobility", *Information Sciences An International Journal, Information Sciences* 129, 2000, pp. 1-15.

Moravec, Hans P., "Three Degrees for a Mobile Robot", *Carnegie-Mellon University Robotics Institute*, N00014-81-K-0503, Feb. 1984.

Naude, J., "Varibox Joint Based CTV", Barloworld CVT Technologies, web address: http://www.barloworld-cvt.com.

Salerno, Alessio, et al., "The Robust Design of a Two-Wheeled Quasiholonomic Mobile Robot", Proceedings of DETC'03, ASME 2003 Design Engineering Technical Conferences and Computers and Information in Engineering Conference, Chicago, Illinois, Sep. 2-6, 2003.

Amar, F. Ben, "Performance Evaluation of Locomotion Modes of a Hybrid Wheel-legged Robot for Self-Adaptation to Ground Conditions", Proceedings of ASTRA '04, 8th ESA Workshop on Advanced Space Technologies for Robotics and Automation, pp. 235-242, Nov. 2004.

Amar, F. Ben, "Stability and Traction Optimization of a Reconfigurable Wheel-Legged Robot", *The International Journal of Robotics Research*, Oct. 2004.

Asada, Haruhiko, et al., "Design and Control of a Variable Footprint Mechanism for Holonomic Omnidirectional Vehicles and its Application to Wheelchairs", *IEEE Transactions on Robotics and Automation*, vol. 15, No. 6, Dec. 1999.

Bell, David A., "Design Criteria for Obstacle Avoidance in a Shared-Control System", RESNA, Jun. 17-24, 1994.

Berkemeier, Matthew, "Visual Servoing of an Omni-Directional Mobile Robot for Alignment with Parking Lot Lines", Proceedings of the 2002 IEEE International Conference for Robotics & Automation, Washington, DC, May 2002, pp. 4204-4210.

Borenstein, Johann, "Compliant-Linkage Kinematic Design For Multi-Degree-of-Freedom Mobile Robots", SPIE Symposium on Advances in Intelligent Systems, Mobile Robots VII, Boston, MA, Nov. 15-20, 1992, pp. 344-351.

Borenstein, Johann, "The Vector Field Histogram—Fast Obstacle Avoidance for Mobile Robots", *IEEE Journal of Robotics and Automation*, vol. 7, No. 3, Jun. 1991, pp. 278-28.

Borenstein, Johann, "Mobile Robot Positioning-Sensors and Techniques", *Journal of Robotic Systems, Special Issue on Mobile Robots*, 1996, vol. 14, No. 4, pp. 231-249.

Borenstein, Johann, Experimental Results from UM's Proprioceptive Position Estimation System Installed on CMU's ATRV, *University of Michigan Technical Report* #03-01, Feb. 19, 2003.

Borenstein, Johann, "Gyrodometry: A New Method for Combining Data from Gyros and Odometry in Mobile Robots", Proceedings of the 1996 IEEE International Conference on Robotics and Automation, Apr. 23-28, 1996, pp. 423-428.

Borenstein, Johann, "The NavChair Assistive Wheelchair Navigation System", IEEE Transactions on Rehabilitation Engineering, vol. 7, No. 4, Dec. 1999, p. 443-450.

Byun, Kyung-Seok, "CVT Control of an Omnidirectional Mobile Robot with Steerable Omnidirectional Wheels for Energy Efficient Drive", Proceedings of IEEE International Conference on Robotics & Automation, Sep. 14-19, 2003, pp. 503-508.

Chirikjian, Gregory S., "Kinematic Design and Commutation of a Spherical Stepper Motor", *IEEE/ASME Transactions on Mechatronics*, vol. 4, No. 4, Dec. 1999, pp. 342-353.

Demeester, E., "Assessing the User's Intent Using Bayes' Rule: Application to Wheelchair Control", Proceedings of the ASER, 2003.

Diegel, Olaf, "Improved Mecanum Wheel Design for Omni-directional Robots", Proc. 2002 Australasian Conference on Robotics and Automation, Auclkand, Nov. 27-29, 2002.

Dubowsky, Steven, "PAMM—A Robotic Aid to the Elderly for Mobility Assistance and Monitoring: A "Helping-Hand" for the Elderly", IEEE International Conference on Robotics and Automation, 2000.

Estier, T. "An Innovative Space Rover with Extended Climbing Abilities", Robotics, 2000, Proceedings of the Fourth International Conference held in Albuquerque, NM, Feb. 27-Mar. 2, 2000, pp. 333-339.

Ferreira, Enrique, D., "Control of the Gyrover A Single-Wheel Gyroscopically Stabilized Robot", *Advanced Robotics*, Apr. 2000.

Fulmer, Christopher R., "The Design and Fabrication of an Omni-Directional Vehicle Platform", Ph.D. Thesis, Unversity of Florida, 2003.

Furuta, Masaharu, "A System Design for Transforming an Everyday Object into an Omnidirectional Robot", 2nd International Conference on Autonomous Robots and Agents, Dec. 13-15, 2004, Palmerston North, New Zealand.

Halme, Aarne, "Robot Motion By Simultaneous Wheel And Leg Propulsion" 4th International Conference on Climbing and Walking Robots, Karlsruhe Germany, Professional Engineering Publishing Ltd, s, 1013-1020, 2001.

Halme, Aarne, "Development of a WorkPartner Robot—design of actuating and motor control system", CLAWAR'99 2nd International Conference on Climbing and Walking Robots, Portsmouth, England, Sep. 13-15, 1999.

Haueisen, Brooke, "Mobility Analysis of Small, Lightweight Robotic Vehicles", Apr. 25, 2003.

Honzik, Bohumil, "Inverse Kinematics and Control of the Assistive Robot for Disabled", *IFAC*, 2003.

Hoyer, H, "The OMNI-Wheelchair-State of the Art", CSUN's 1999 Conference, Mar. 5, 1999.

Iagnemma, Karl, "Control of Robotic Vehicles with Actively Articulated Suspension in Rough Terrain", *Autonomous Robots* 14, 5-16, 2003.

IGVC (Intelligent Ground Vehicle Competition), *Centurion II Vehicle Design Report*, Bluefield State College, Ground Robotic Vehicle Team, May 2003, website: http://www.igvc.org/design/design_teams.asp?year=2003.

IGVC (Intelligent Ground Vehicle Competition), *2003 Kodiak Design Report*, Autonomous Robotic Vehicle Project, University of Alberta, May 2003, website: http://www.igvc.org/design/design_teams.asp?year=2003.

IGVC (Intelligent Ground Vehicle Competition), *Bearcat* (III Brat Design Report, UC Robert Team, University of Cincinnati, Jun. 2, 2003, website: http://www.igvc.org/design/design_teams.asp?year=2003.

IGVC (Intelligent Ground Vehicle Competition), *UMD-Smart Design Report*, University of Michigan, May 16, 2003, website: http://www.igvc.org/design/design_teams.asp?year=2003.

IGVC (Intelligent Ground Vehicle Competition), *A Technical Report on TailGator*, University of Florida, May 2003, website: http://www.igvc.org/design/design_teams.asp?year=2003.

Jarvis, Ray, "An Articulated Six Wheel Drive Robot for Very Rough Terrain Navigation", Proc. 2002 Australasian Conference on Robotics and Automation, Auckland, Nov. 27-29, 2002, ARAA 2002, pp. 133-138.

Johnson, R. Colin, Spherical motors may expand robot mobility, EE Times Online, Jan. 22, 2001, website: http://www.eetimes.com/story/technology/OEG20010122S0059.

Kingston, Simon, "Evacuation Easy with Descending Wheelchair", *Insight: News From Northumbria University*, Issue 6, 2005.

Krovi, Venkat, "Optimal Traction Control In A Wheelchair With Legs And Wheels", Proceedings of the 4th National Applied Mechanisms And Robotics Conference, Dec. 1995, AMR 95-030-01.

Lauria, M., "Octopus; An Autonomous Wheeled Climbing Robot", *Robotics and Autonomous Systems*, In Proceedings of the Fifth International Conference on Climbing and Walking Robots, Professional Engineering Publishing Limited, Bury St Edmunds and London, Autonomous Systems Lab, 2006.

Lawn, Murray, "Study of Stair-Climbing Assistive Mechanisms for the Disabled", PhD Dissertation, Mechanical Systems Engineering, Graduate School of Marine Science and Engineering, Nagasaki University, Nagasaki, Japan City, Dec. 2002.

Lawn, Murray, "Development and practical application of a stairclimbing wheelchair in Nagasaki", *IEEE*, 2001.

Moore, Kevin, "A Six-Wheeled Omnidirectional Autonomous Moblie Robot", *IEEE*, 2001.

Newman, P.M., "C4B-Mobile Robotics", Ph.D. Dissertation, Oct. 2003.

Ribeiro, Maria Isabel, "Kinematics Models of Mobile Robots", *Instituto Superior Tecnico (IST)*, Apr. 2002, Portugal.

Rosser, Saul, Jackson, Ed., "A Holonomic Mobile Robot for Yale's Robocup Team", website: www.cs.yale.edu, 2004.

Salkever, Alex, "The Mind Spinning Potential of the Spherical Motor", *Business Week Online*, Jan. 18, 2001, web address: http://www.businessweek.com/bwdaily/dnflash/jan2001/nf20010118_014.htm.

Schoner, Gregor, "WAD Project where Attractor Dynamics aids wheelchair Navigation", Proceedings of the 2002 IEEE/RSJ Conference, Oct. 2002.

Shah, Sham, "Rear Infra-Red Sensors for the Smartchair", Senior Design Final Report, University of Pennsylvania, May 2, 2003.

Shoval, Dr. Shraga, "Computerized obstacle Avoidance Systems for the Blind and Visually Impaired", *Intelligent Systems and Technologies in Rehabilitation Engineering*, Dec. 26, 2003, pp. 414-448.

Smith, Mark E. "Omni-Wheels", web address: http://www.wheelchairjunkie.com/page10.html.

Spenko, Matthew, "Analysis and Design of an Omnidirectional Platform for Operation on Non-Ideal Floors", *DME*, 2001.

Stegath, Keith, "Three-wheeled Autonomous Agent (Gnuman) With Roulette and Hypotrochiod Motion", Florida Conference on Recent Advances in Robotics, University of Central Florida, Orlando, Florida, May 6-7, 2004.

Tahboub, Karim, A., "A Compliant Semi-Autonomous Reactive Control Architecture Applied to Robotic Holonomic Wheelchairs", Proceeding of the 1999 IEEE/ASME International Conference on Advanced Intellignet Mechanisms, Sep. 19-23, 1999.

Tosunoglu, Sabri, "Design of a Fault-Tolerant Holonomic Mobile Platform" Florida Conference on Recent Advances in Robotics, FCRAR 2006, Florida International University, Miami, Florida, May 25-26, 2006.

Ulrich, Iwan, Appearance-Based Obstacle Detection with Monocular Color Vision, Proceedings of the AAAI National Conference on Artificial Intelligence, Austin, Texas, Jul./Aug. 2000.

Williamson, John, "A Review and Opinion of the Independence Technology IBOT 3000 Transporter", *Powerchair Review*, Dec. 2003.

Wood, Carl, "T2 Omni-Directional Vehicle Mechanical Design", *SPIE*, vol. 3838, Sep. 1999, pp. 69-77.

Yamashita, Atsushi, "Development of a Step-Climbing Omni-Directional Mobile Robot", website: http://sensor.eng.shizuoka.ac.jp/~yamasita/paper/B/B006Final.pdf.

Yu, Haoyong, "Omni-Directional Mobility Using Active Split Offset Castors", *ASME*, vol. 126, Sep. 2004, pp. 822-829.

* cited by examiner

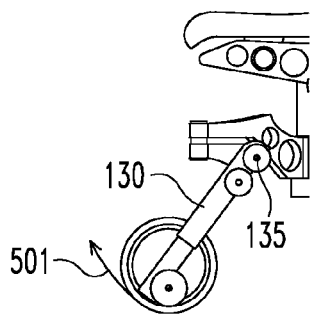
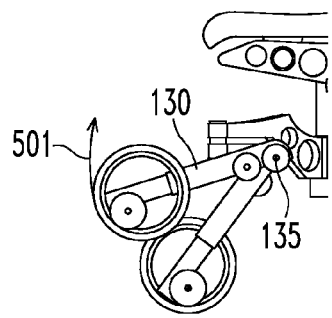
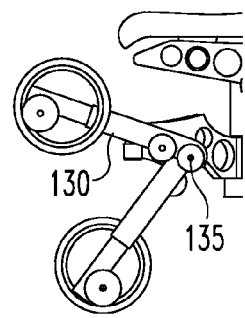
*Fig. 7A*   *Fig. 7B*   *Fig. 7C*
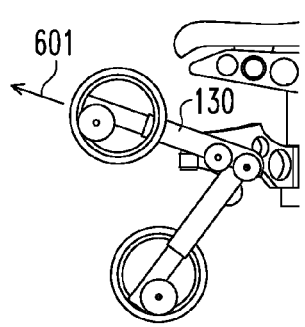
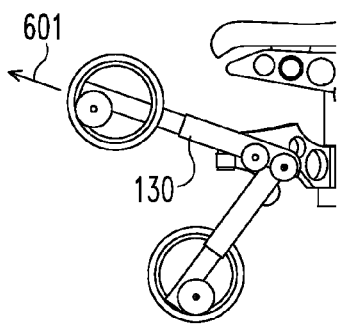
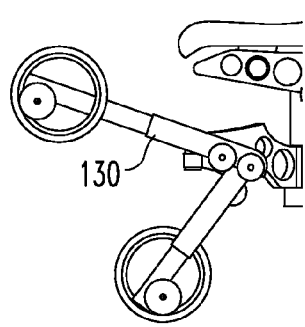
*Fig. 7D*   *Fig. 7E*   *Fig. 7F*
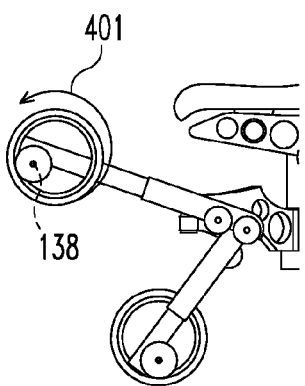
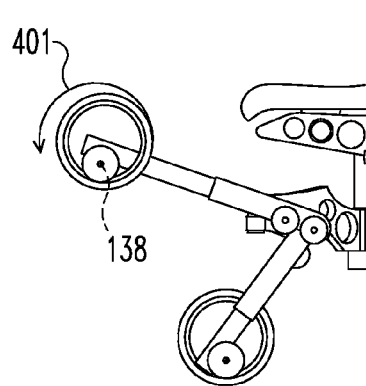
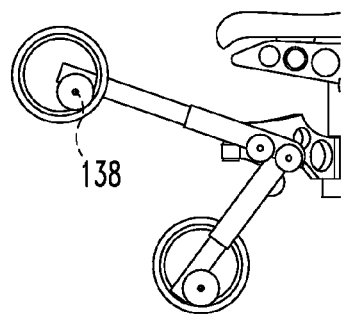
*Fig. 7G*   *Fig. 7H*   *Fig. 7I*

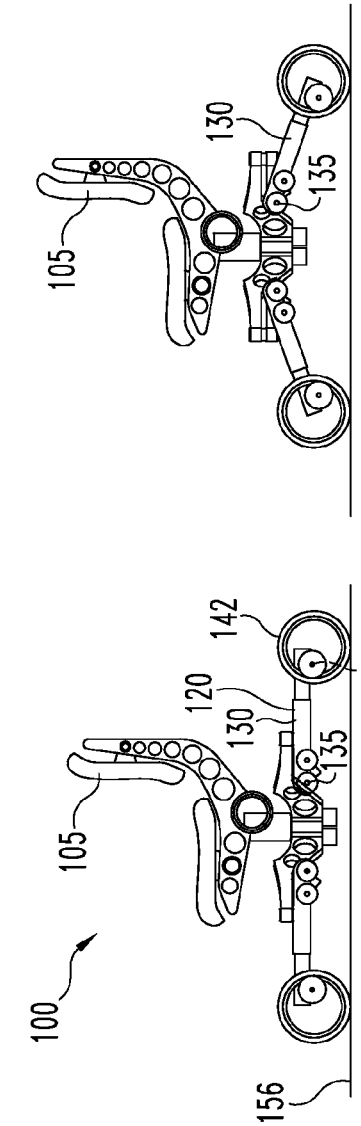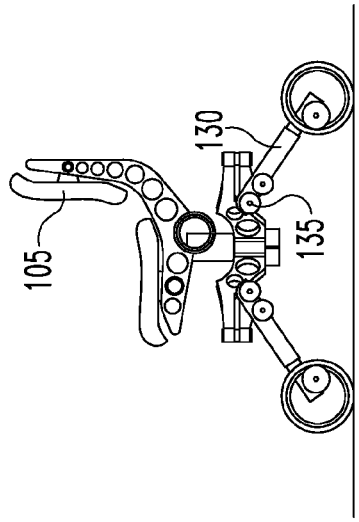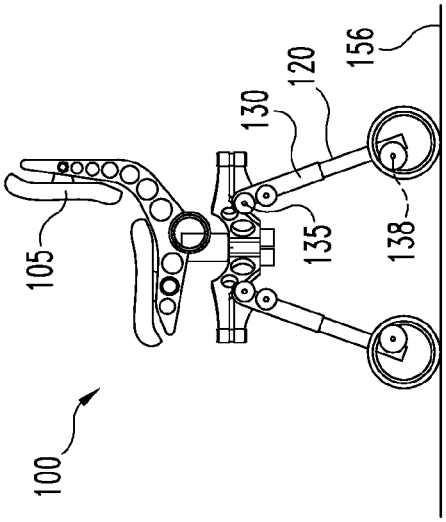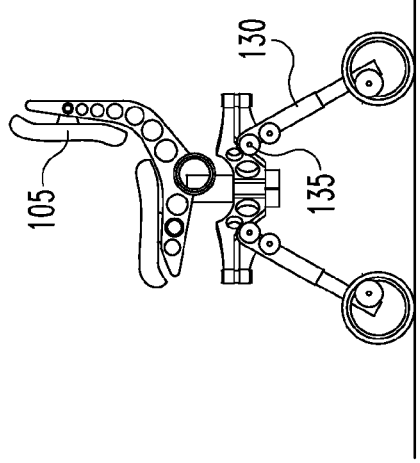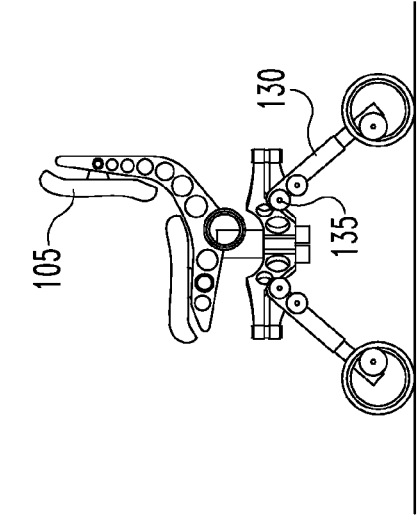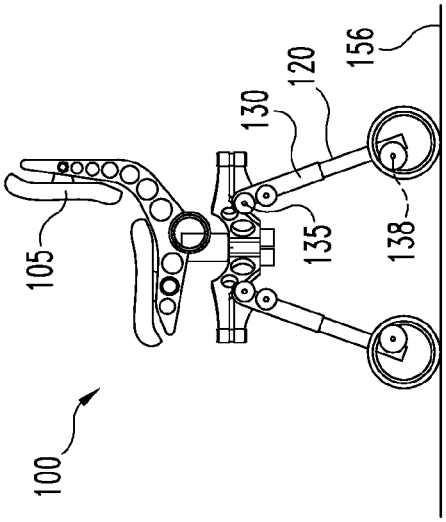

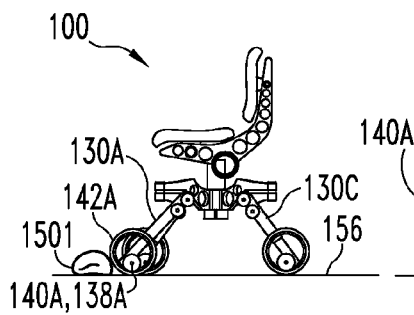 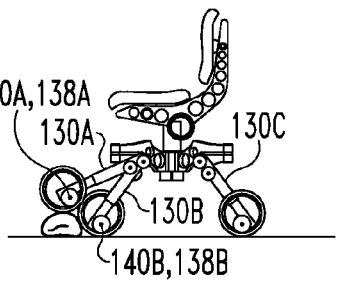 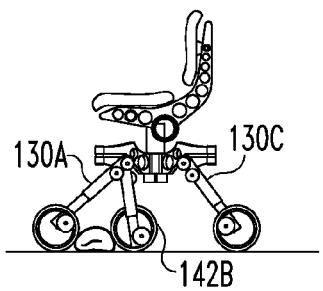
*Fig. 15A*   *Fig. 15B*   *Fig. 15C*
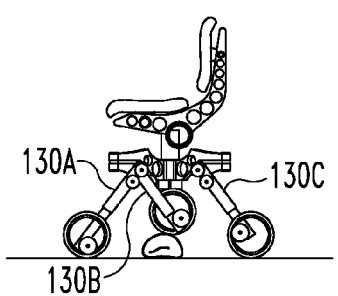 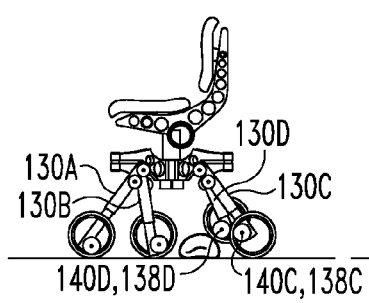 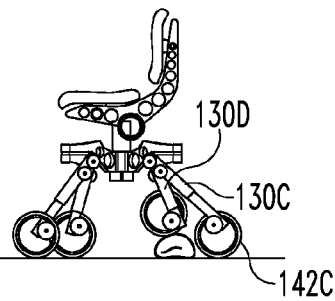
*Fig. 15D*   *Fig. 15E*   *Fig. 15F*
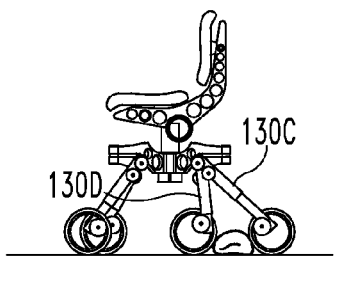 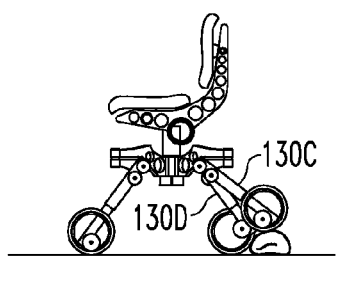 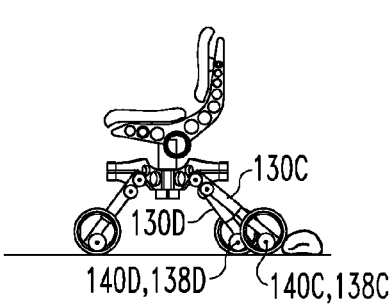
*Fig. 15G*   *Fig. 15H*   *Fig. 15I*

ARTICULATED WHEEL ASSEMBLIES AND VEHICLES THEREWITH

This application is a continuation of PCT/US06/62107, filed Dec. 14, 2006, which claims the benefit of U.S. Provisional Application No. 60/755,625, filed Dec. 30, 2005, the entireties of which is hereby incorporated by reference. This application also claims the benefit of U.S. Provisional Application No. 60/755,625, filed Dec. 30, 2005, the entirety of which is hereby incorporated by reference.

FIELD

This invention relates generally to articulated wheel assemblies and vehicles therewith, and more particularly to moving wheeled vehicles, such as apparatuses, systems and methods for moving wheelchairs with articulated wheel assemblies.

BACKGROUND

Vehicles have been used to move various types of payloads. For example, rovers and remotely-operated wheeled vehicles have been used to carry sensors into environments dangerous or inhospitable to people. Other wheeled vehicles are used to assist people by moving various types of payloads, such as through a manufacturing plant. Still other wheeled vehicles, such as wheelchairs, are used as assistive devices to provide mobility to people who are otherwise limited in their ability to travel within their environment.

Many people throughout the world have physical restrictions that require them to use wheelchairs as their primary means of mobility. Although currently available assistive motion platforms allow their users to achieve a basic level of freedom, most users find their independence severely restricted by the mechanical and operational limitations of these devices. Unfortunately, even advanced wheelchairs can be stopped by a curb, step, irregular surface or small obstacle, and their ability to maneuver in tight spaces can be restricted by their physical configuration. These limitations can not only affect the ability of the user to freely access public and private spaces, but can make it difficult, if not impossible, to move about in an intuitive manner.

Others have attempted to address some of the concerns facing wheelchair users; however, the assistive devices that have been developed have limited functionality and can only be used in a small number of circumstances. For example, some wheelchairs are capable of omnidirectional-like movement, but are incapable of operating on anything other than a smooth, hard surface. Others are capable of traveling over rough terrain, but the extended wheelbases and oversized tires used to achieve this ability are too large for maneuvering in confined spaces.

As such, there is a need for a wheelchair that can function in an increased number of environments, traverse everyday obstacles, provide the natural movement patterns that many not confined to wheelchairs take for granted, and allow people who rely on wheelchairs for their mobility to focus their efforts on where they are going and not how they will get there.

Consequently, there is a need for an improved vehicle, an articulated wheel assembly, and in particular, an improved assistive mobility platform.

Certain preferred features of the present invention address these and other needs and provide other important advantages.

Some or all of these features may be present in the corresponding independent or dependent claims, but should not be construed to be a limitation unless expressly recited in a particular claim.

SUMMARY

It is an object of one embodiment of the present invention to provide improved articulated wheel assemblies and vehicles therewith.

It is an object of another embodiment of the present invention to provide an omnidirectional, obstacle climbing assistive device that provides quick, easy and natural movements, and can operate on smooth surface as well as uneven terrain.

It is an object of still another embodiment of the present invention to lower the vehicle's center of gravity to increase stability, such as may be required at high speeds or on uneven terrain, or raise its center of gravity, such as to provide the user with the ability to reach high locations.

It is an object of other embodiments of the present invention to traverse a wide variety of natural and man-made obstacles, for example, roadway curbs and steps, including steps approximately 12 inches high.

It is an object of yet another embodiment of the present invention to adjust the vehicle's track width to pass through both narrow obstacles, such as doorways, and to increase its stability to prevent tipping while maneuvering.

It is an object of still another embodiment of the present invention to provide intuitive motion to the user.

It is yet another object of embodiments of the present invention to maintain the seating system level and to keep the occupants securely attached to the vehicle while maneuvering.

It is still a further object of embodiments of the present invention to provide a vehicle including a payload platform and an offset link with a proximal end and a distal end. The offset link proximal end is pivotally connected with a vertically aligned pivot axis to the payload platform, and the offset link distal end is positioned a horizontal distance from the vertically aligned pivot axis. The vehicle also includes a first extendable member with a proximal end, a distal end, a first length and a first extension motor. The first extendable member proximal end is pivotally connected to the offset link distal end, where the first extension motor changes the first length, and where the first length and the vertically aligned pivot axis define a first swing angle. The vehicle further includes a first rotating motor connected to the first extendable member and the offset link, where the first rotating motor rotates the first extendable member and changes the first swing angle. The vehicle still further includes a first wheel with a first central axis, where the first wheel is rotatably connected to the first extendable member distal end. The vehicle additionally includes a first drive motor coupled to the first wheel, where the first drive motor rotates the first wheel around the first wheel central axis.

Another object of embodiments of the present invention provide a wheelchair for transporting a person across a surface that includes a seat for carrying a person and an articulated wheel assembly. The articulated wheel assembly includes an offset member with a proximal end and a distal end, the proximal end pivotally connected to the seat with a vertically aligned pivot axis, the distal end positioned a horizontal distance from the vertically aligned pivot axis. The articulated wheel assembly also includes an extendable member with a first opposing end, a second opposing end and a length, the extendable member first end connected to the offset member distal end, and the extendable member second end positioned on an opposite side of the vertical pivot axis from the offset member distal end. The articulated wheel assembly additionally includes an extension motor connected to the extendable member, where the extension motor changes the extendable member length; a wheel connected to the extendable member second end; and a propulsion motor connected to the wheel, where the propulsion motor rotates the wheel.

Yet another object of embodiments of the present invention provides a wheelchair for transporting a person across a surface that includes a seat for carrying a person and an articulated wheel assembly. The articulated wheel assembly includes an offset member with a proximal end and a distal end, the proximal end pivotally connected to the seat with a vertically aligned pivot axis, the distal end positioned a horizontal distance from the vertically aligned pivot axis. The articulated wheel assembly also includes an elongated member with a first opposing end, a second opposing end and a central axis between the first and second opposing ends, the elongated member first end connected to the offset member distal end. The articulated wheel assembly further includes a rotating motor connected to the offset member and the elongated member, where the rotating motor changes the angle between the vertically aligned pivot axis and the elongated member central axis. The articulated wheel assembly additionally includes a wheel connected to the elongated member second end and a propulsion motor connected to the wheel, where the propulsion motor rotates the wheel.

Further objects, features and advantages of the present invention shall become apparent from the detailed drawings and descriptions provided herein.

Each embodiment described herein is not intended to address every object described herein, and each embodiment does not include each feature described.

BRIEF DESCRIPTION OF THE DRAWINGS

FIGS. 7A-7I are partial side elevational views of the wheelchair and an articulated wheel assembly depicted in FIG. 3B.

FIGS. 9A-9F are top plan views of the wheelchair and articulated wheel assemblies depicted in FIG. 3B.

FIGS. 10A-10F are side elevational views of the wheelchair and articulated wheel assemblies depicted in FIG. 3B.

FIGS. 15A-15I are side elevational views of the wheelchair and articulated wheel assemblies depicted in FIG. 3B traversing a limited size obstacle.

DETAILED DESCRIPTION OF THE ILLUSTRATED EMBODIMENTS

Figure 1:
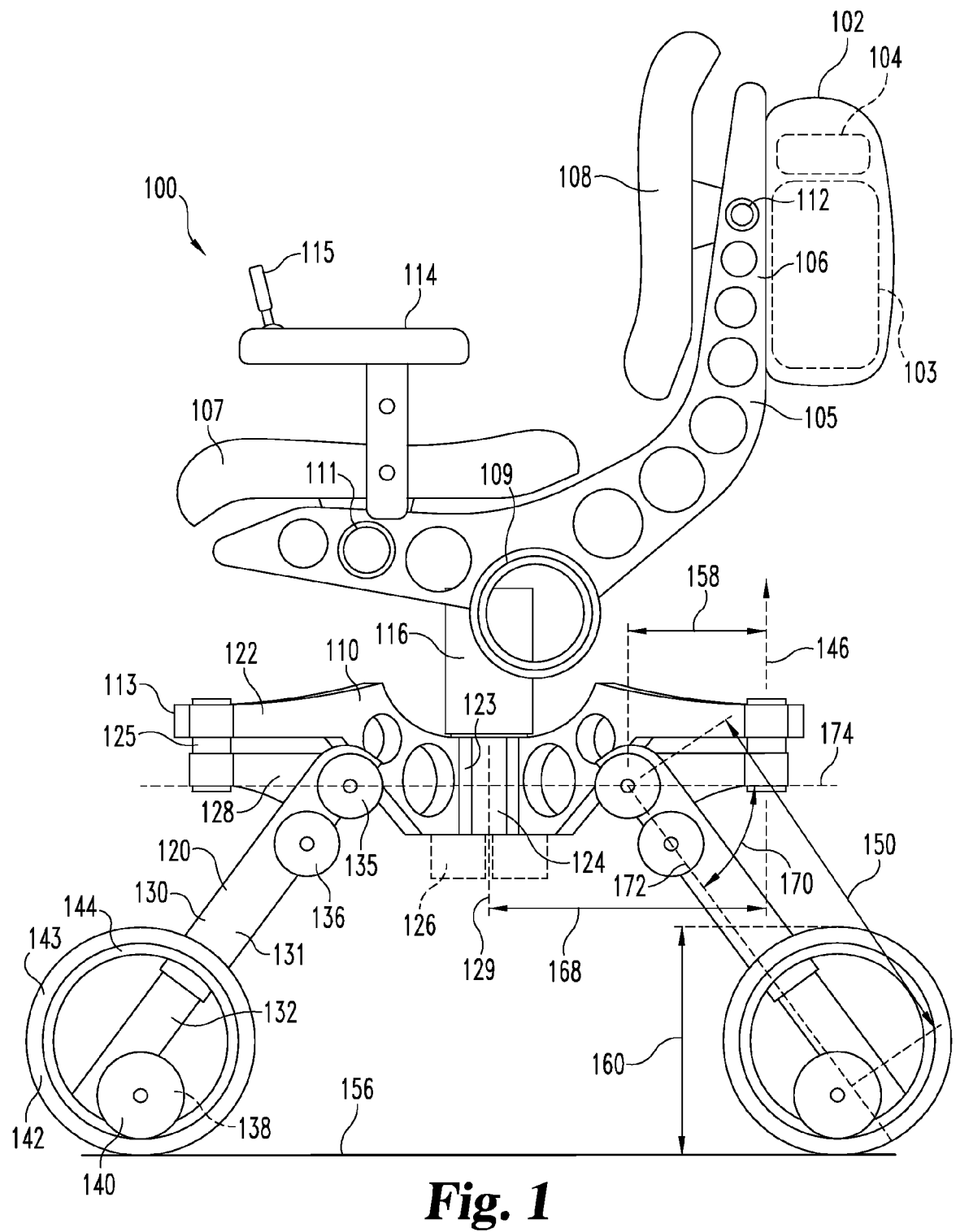
FIG. 1 is a side elevational view of wheelchair and articulated wheel assemblies according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

The present invention relates to articulated wheel assemblies and vehicles utilizing articulated wheel assemblies. Example vehicles include wheelchairs, walkers, robots, motion platforms and remotely-operated vehicles that can carry various payloads, such as people, variously sized cargo, and sensing equipment by way on nonlimiting example. The size of the vehicle may be small, with overall dimensions less than one foot, and large, with overall dimensions on the order several to tens of feet.

Figure 2:
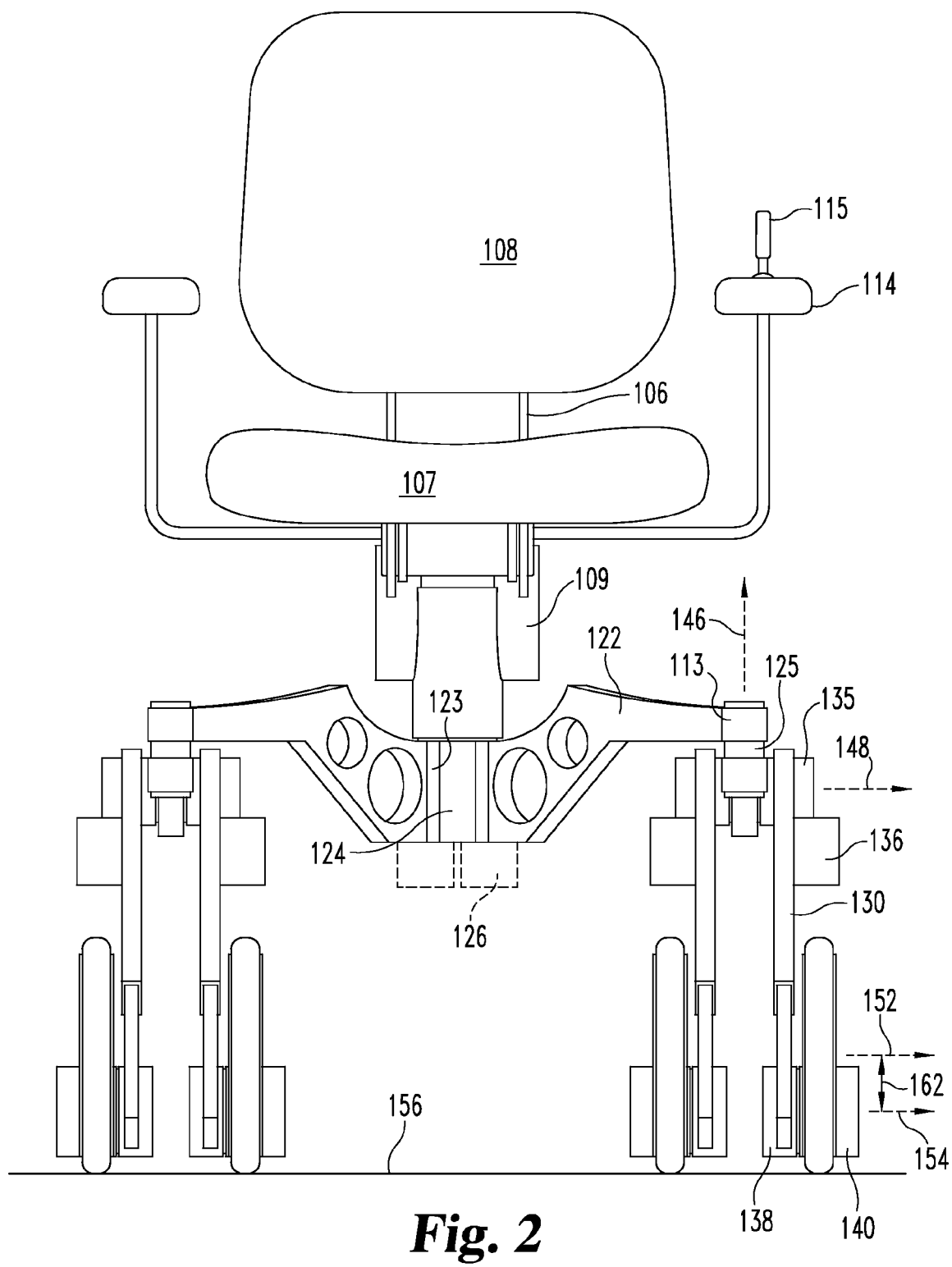
FIG. 2 is a front elevational view of the wheelchair and articulated wheel assemblies of FIG. 1.
Figure 3A:
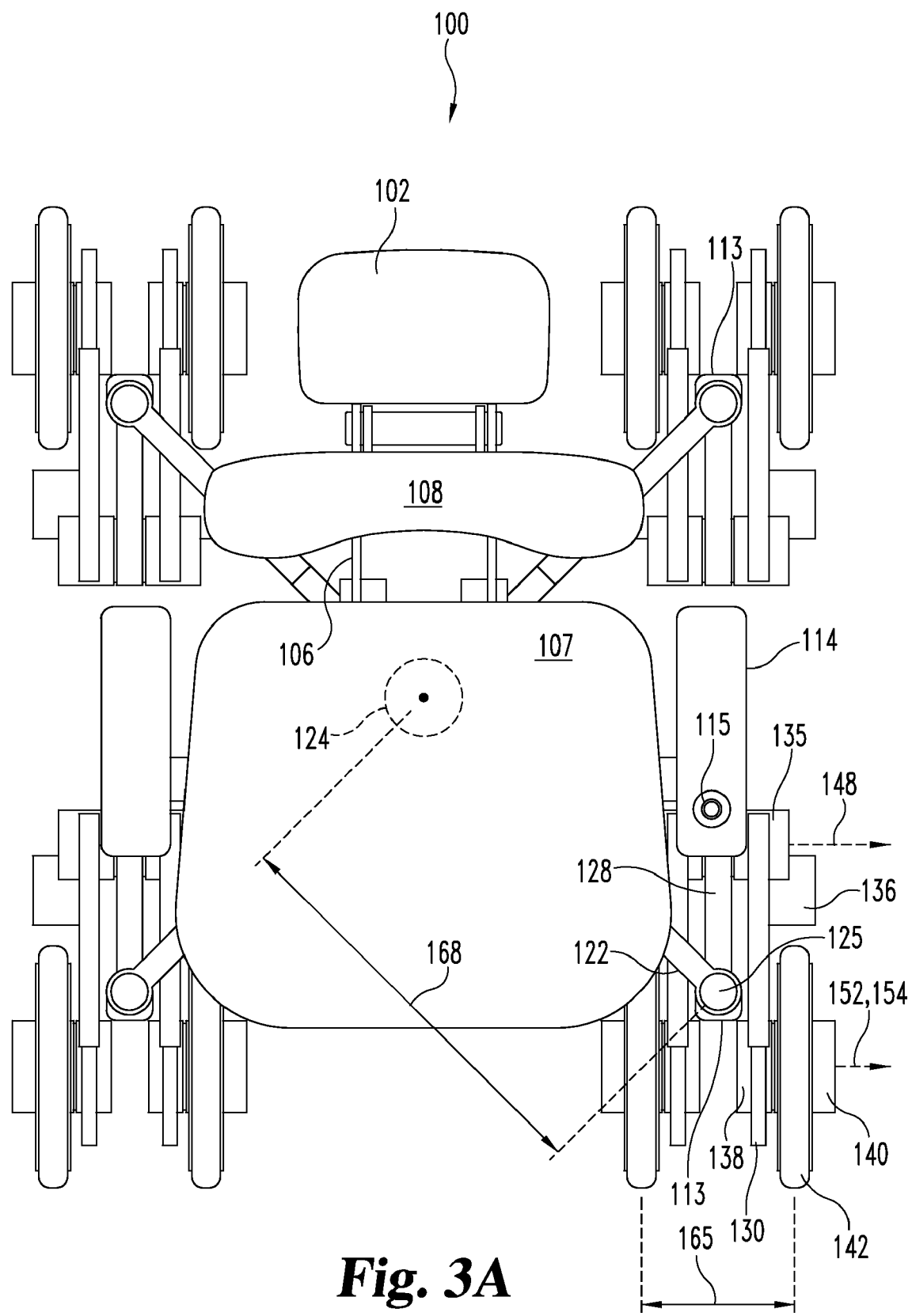
FIG. 3A is a top plan view of the wheelchair and articulated wheel assemblies of FIG. 1.

Depicted in FIGS. 1-3 is an embodiment of the present invention, a vehicle or motion platform, for example, wheelchair 100, according to one embodiment of the present invention. The wheelchair 100 includes a payload platform, for example seat 105, for supporting the user and a motion base 110 that includes two or more wheel assembly support struts 122 (four wheel assembly support struts 122 in the illustrated embodiment) arranged around a central hub 124 to which the payload platform is rotatably attached.

Figure 3B:
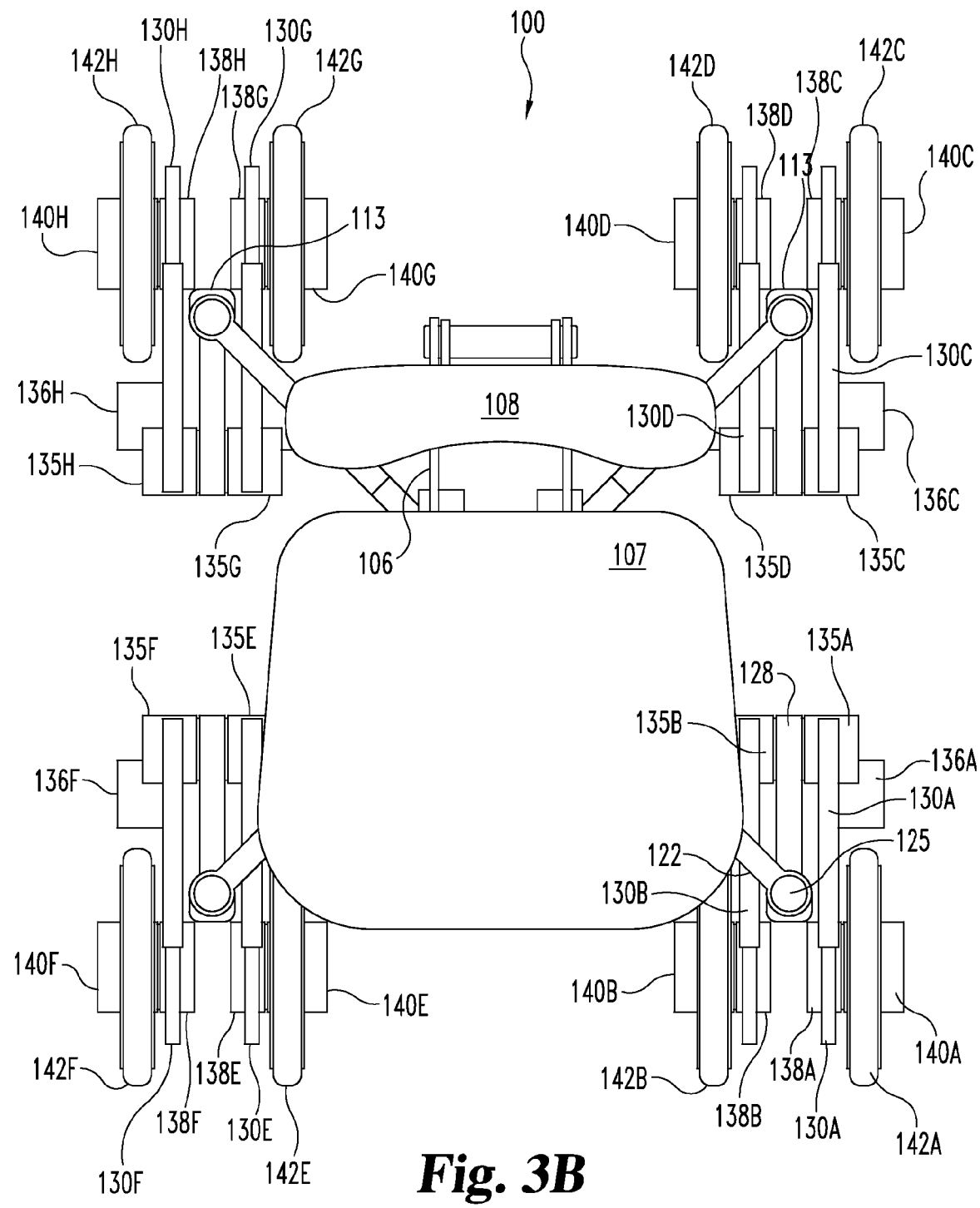
FIG. 3B is a partial top plan view of the wheelchair and articulated wheel assemblies of FIG. 3B.
Figure 4C:
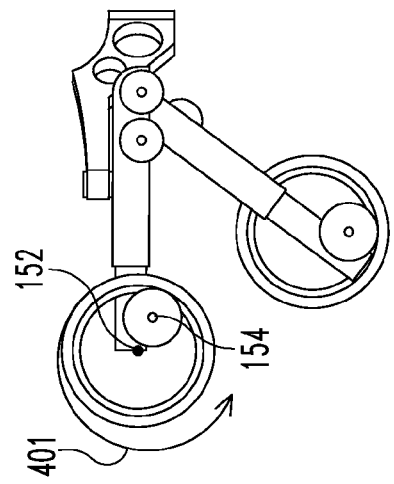
FIGS. 4A-4F are side elevational views of an articulated wheel assembly depicted in FIG. 3B.
Figure 4F:
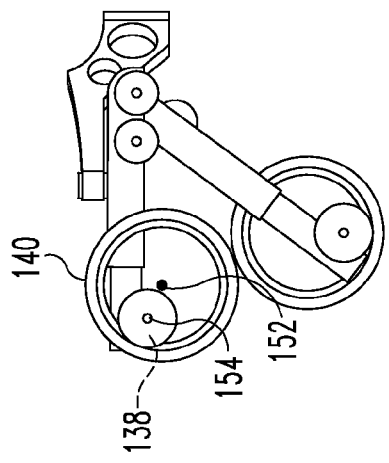
Figure 4B:
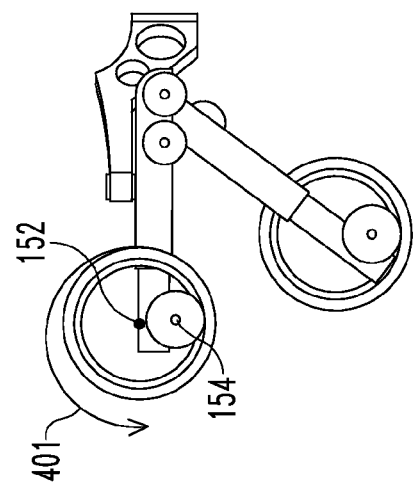
Figure 4E:
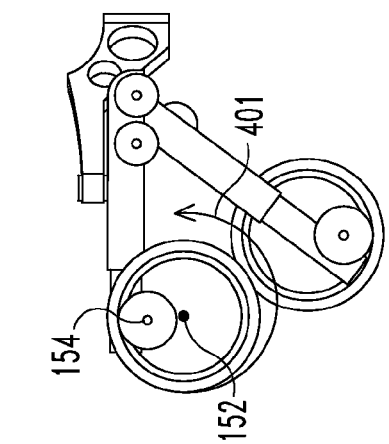
Figure 4A:
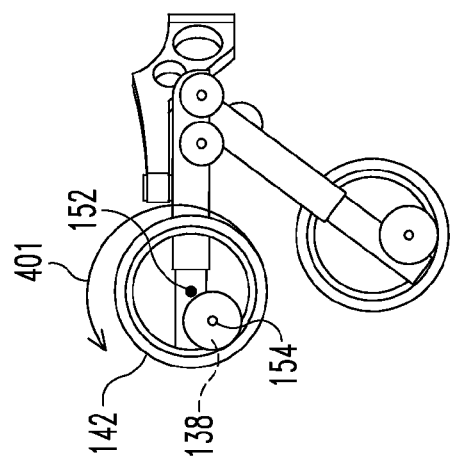
Figure 4D:
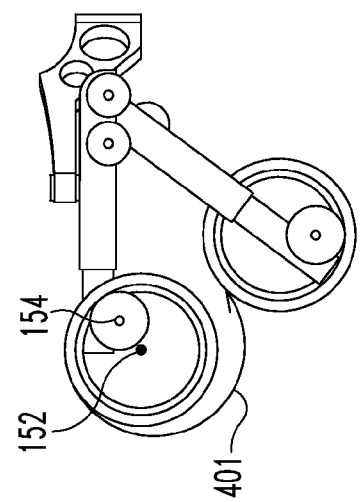
Figure 5A:
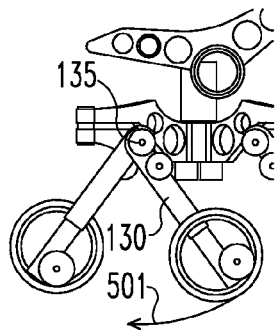
FIGS. 5A-5F are partial side elevational views of the wheelchair and an articulated wheel assembly depicted in FIG. 3B.
Figure 5B:
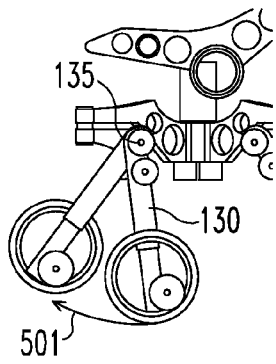
Figure 5C:
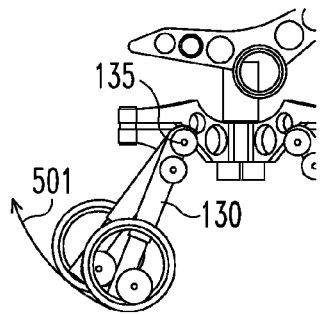
Figure 5D:
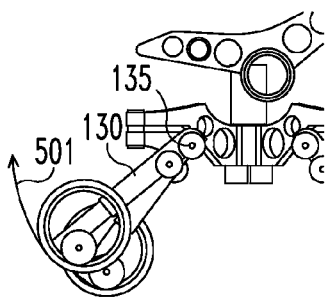
Figure 5E:
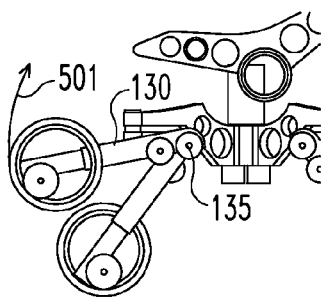
Figure 5F:
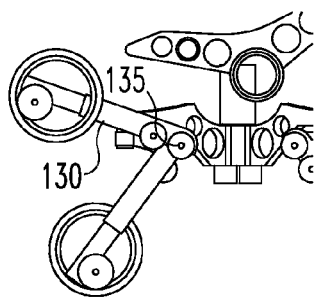

Seat 105 includes frame 106, seat pan 107, back rest 108, seat tilt pivot 109, and arm rest 114. Arm rest 114 includes a controller for commanding the wheelchair 100, for example, joystick 115. Attached to frame 106 is housing 102 that encloses battery 103 and microprocessor 104. FIG. 3B is similar to FIG. 3A with housing 102, arm rests 114, and joystick 115 removed for illustrative purposes.

Seat pan 107 connects to seat pan tilt pivot 111, which connects to frame 106 and allows the user to tilt seat pan 107 with respect to frame 106 for user comfort. Back rest 108 connects to back rest tilt pivot 112, which connect to frame 106 and allows the user to adjust the tilt of back rest 108 with respect to frame 106 for user comfort.

Seat 105 connects to seat tilt pivot 109, which connects to seat adjustment mechanism 116. Seat tilt pivot 109 allows the user to adjust the seat tilt with respect to the motion base 110 for user comfort. Seat adjustment mechanism 116 allows the user to raise, lower, and/or pivot seat 105 with respect to motion base 110. In the illustrated embodiment, seat adjustment mechanism 116 is powered by battery 103, although in alternate embodiments, seat adjustment mechanism 116 is a manually-adjusted mechanism and is not powered.

Seat adjustment mechanism 116 is connected to central hub 124. Wheel assembly support strut pivots 123 pivotally connect the wheel assembly support struts 122 to central hub 124. In the illustrated embodiment, wheel assembly support strut pivot 123 allows wheel assembly support strut 122 to pivot with minimal resistance. In an alternate embodiment, wheel assembly support strut pivot 123 is selectively lockable and capable of restraining wheel assembly support strut 122 in a particular orientation with respect to central hub 124. In still another embodiment, wheel assembly support strut pivot 123 is further connected to a wheel assembly support strut pivot actuator 126, which applies force to wheel assembly support strut 122 and actively changes the orientation of wheel assembly support strut 122 with respect to central hub 124. In FIGS. 1 and 2, wheel assembly support strut pivot actuator 126 is illustrated with dashed lines to indicate an example location where the wheel assembly support strut pivot actuators 126 are located in an alternate embodiment.

Each wheel assembly support strut 122 is rotatably connected by a vertical wheel assembly pivot 125 to an offset link, for example offset connecting arm 128. Each articulated wheel assembly 120 includes offset connecting arm 128, two linear actuators 130, two upper rotary actuators 135, two linear actuator motors 136, two lower rotary actuators 138, two propulsion motors 140, and two wheels 142. The linear actuator 130 includes an upper portion 131 and a lower portion 132 that move with respect to one another to extend or retract the effective length 150 of linear actuator 130. The wheel 142 includes a wheel outer surface 143 and a wheel drive portion 144.

Each offset connecting arm 128 rotatably connects to a wheel assembly support strut 122 with a vertical wheel assembly pivot 125. In the illustrated embodiment, offset connecting arm 128 pivots around vertical wheel assembly pivot axis 146 principally in response to forces exerted on the surface 156 by wheels 142. In an alternate embodiment, vertical wheel assembly pivot 125 includes a clutch or detent mechanism that provides for the locking of offset connecting arm 128 in at least one position with respect to wheel assembly support strut 122. In still another embodiment, vertical wheel assembly pivot 125 includes an actuator that applies a force to rotate offset connecting arm 128 with respect to wheel assembly support strut 122.

Offset connecting arm 128 is connected to two upper rotary actuators 135 and each upper rotary actuator 135 is connected to a linear actuator 130. Each upper rotary actuator 135 applies a rotational force to its respective linear actuator 130 and can rotate linear actuator 130 around upper rotary actuator axis 148 or can hold linear actuator 130 at a constant rotational position with respect to offset connecting arm 128. In an alternate embodiment, the two upper rotary actuators 135 for each articulated wheel assembly 120 may be combined into a single unit that can independently rotate each of the two linear wheel actuators 130.

Each linear actuator 130 includes means for extending and retracting linear actuator 130, for example, a linear actuator motor 136 that can extend, shorten or hold constant the linear actuator effective length 150. In the illustrated embodiment, linear actuator 130 includes telescoping upper and lower portions 131 and 132, respectively; however, in other embodiments a sliding or other arrangement is used to provide for the lengthening, shortening or holding constant of linear actuator effective length 150.

Each linear actuator 130 is connected to a lower rotary actuator 138, which is further connected to a wheel 142. The lower rotary actuator 138 rotates wheel rotation axis 152 around wheel pivot axis 154. As such, the orientation of wheel 142 with respect to linear actuator 130 may be changed or held constant during operation.

Adjacent to lower rotary actuator 138 is propulsion motor 140 which is connected to wheel drive portion 144 and rotates wheel 142 about wheel rotation axis 152. In the illustrated embodiment, the wheel 142 and propulsion motor 140 are arranged as a "hubless wheel," although in other embodiments a more conventional hubbed wheel and associated propulsion motor are used. Propulsion motor 140 is connected to and imparts the drive force to wheel drive portion 144. Wheel drive portion 144 is connected to wheel outer surface 143 which contacts surface 156. In alternate embodiments, at least one articulated wheel assembly 120 does not include a propulsion motor 140 and the wheel 142 passively rotates in response to the motion of wheelchair 100.

Although each articulated wheel assembly 120 is depicted with two linear actuators 130 and two wheels 142, alternate embodiments include one linear actuator 130 and one wheel 142. Additionally, alternate embodiments include a rigid attachment between offset connecting arm 128 and linear actuator 130. Still further embodiments include a linear actuator 130 with a fixed linear actuator effective length 150. Yet, further embodiments connect linear actuator 130 directly to propulsion motor 140, resulting in a set orientation between wheel rotation axis 152 and linear actuator 130.

Wheelchair 100 further includes at least one battery 103 and at least one microprocessor 104. Housing 102 encloses the illustrated battery 103 and microprocessor 104. Battery 103 is connected to and provides power to microprocessor 104 and the various actuators and motors in wheelchair 100.

Battery 103 includes a means for recharging, such as a cord that may plug into a typical household outlet. Microprocessor 104 controls the various actuators, motors and sensors included with wheelchair 100. Microprocessor 104 receives input from the user, and the sensors 113 if present, and calculates the appropriate commands to send to the various actuators and motors to achieve the motion desired by the user. Microprocessor 104 may be connected to the actuators and motors using different means of communication, for example, electrical wires, fiber optic cables, and wireless communication. Although depicted as attached to a wheel assembly support strut 122, alternate embodiments of wheelchair 100 include sensors located at different locations on wheelchair 100 to provide environmental and operational sensing for the user and/or microprocessor.

The term sensor describes a device that detects a physical stimulus, for example, a device that ascertains the presence of an obstacle and is used by the motion platform to traverse the obstacle. Example sensors include devices utilizing ultrasonic, infrared, laser, television, and charged coupled device technologies as well as others that are capable of detecting the presence of an obstacle. Alternate embodiments do not include sensors and rely on input commands from the user to negotiate obstacles. Still other embodiments utilize a combination of sensors and inputs from the user to negotiate obstacles, for example, the user selecting a particulate mode, such as a narrow passage negotiation mode, and the sensors being utilized in response to the mode selection in order to carry out the desired function.

Although the four articulated wheel assemblies 120 depicted in the illustrated embodiment are similarly sized and configured, alternate embodiments include articulated wheel assemblies 120 with alternate dimensions and alternate numbers of components. For example, one alternative embodiment includes front wheels 142 that are smaller than rear wheels 142. Another alternate embodiment includes front articulated wheel assemblies 120 with a single linear actuator 130 and a single wheel 142, while the rear articulated wheel assemblies 120 include two linear actuators 130 and two wheels 142.

In the illustrated embodiment, the linear actuator effective length 150 can be changed during operation by linear actuator motor 136. Longer linear actuator effective length 150 can result in the ability for wheelchair 100 to achieve greater stability, although the longer linear actuator effective length 150 generally increases the stresses on upper rotary actuator 135, or on the connection between linear actuator 130 and the wheel assembly support strut 122 in embodiments where there is a fixed linear actuator swing angle 170. During operation, the linear actuator effective length 150 can vary from six (6) inches to thirty-six (36) inches. In particular, the linear actuator effective length 150 can vary from nine (9) inches to thirty (30) inches during operation, and more particularly the linear actuator effective length 150 can vary from twelve (12) inches to twenty-four (24) inches during operation. It should be appreciated that linear actuator 130 can include three or more portions that move with respect to one another to extend or retract the effective length 150.

In an alternate embodiment, linear actuator effective length 150 is fixed and can range from six (6) inches to eighteen (18) inches. In the fixed linear actuator effective length 150 embodiment, the length 150 can particularly range from ten (10) inches to fourteen (14) inches, and can more particularly equal approximately twelve (12) inches.

In the illustrated embodiment, the offset connecting arm effective length 158 can range from zero (0) to eight (8) inches. A longer offset connecting arm effective length 158 can require the use of longer wheel assembly support struts 122, thereby increasing the overall dimensions of wheelchair 100, and will increase the stresses on vertical wheel assembly pivot 125. However, a longer offset connecting arm effective length 158 allows the use of longer linear actuators 130 and without increasing the overall dimensions of wheelchair 100, and increases the overall stability that may be achieved by wheelchair 100. Increased linear actuator effective length 150 provides an increased ability for articulated wheel assemblies 120 to clear or traverse obstacles. The offset connecting arm effective length 158 can more particularly range from two (2) to six (6) inches, and more particularly, the offset connecting arm effective length 158 equals approximately four (4) inches.

The wheel height or diameter 160 can range from three (3) to fifteen (15) inches in the illustrated embodiment. A wheel 142 with a larger wheel diameter 160 can more easily roll over obstacles, although a larger wheel diameter 160 can limit the maneuverability of wheelchair 100 and create clearance difficulties with the other elements of articulated wheel assembly 120 and the user. The wheel diameter 160 can particularly range from six (6) inches to ten (10) inches, and more particularly the wheel diameter 160 equals approximately eight (8) inches.

The offset distance 162 between wheel rotation axis 152 and wheel pivot axis 154 can range from zero (0) inches to eight (8) inches in the illustrated embodiment. A larger offset distance 162 enables wheelchair 100 to increase the distance that wheel 142 can extend away from seat 105, although a larger offset distance 162 increases the forces on lower rotary actuator 138. The offset distance 162 can particularly range from two (2) inches to six (6) inches, and the offset distance 162 can more particularly equal approximately four (4) inches.

Although the four articulated wheel assemblies 120 depicted in the illustrated embodiment are similarly sized and configured, alternate embodiments include articulated wheel assemblies 120 with different dimensions and different numbers of components.

In the illustrated embodiment, the wheel offset distance 165 can range from two (2) inches to ten (10) inches. The wheel offset distance 165 can particularly range from four (4) inches to eight (8) inches, and the wheel offset distance 165 can more particularly equal approximately six (6) inches.

The wheel assembly support strut effective length 168 equals the distance between the central axis 129 of the central hub 124 and the vertical wheel assembly pivot axis 146. The wheel assembly support strut effective length 168 is depicted in both FIGS. 1 and 2, although FIG. 1 obliquely depicts wheel assembly support strut 122 wheel assembly support strut effective length 168. As the wheel assembly support strut effective length 168 increases, the overall stability that may be achieved by wheelchair 100 increases. As the wheel assembly support strut effective length 168 decreases, the overall stability that may be achieved by wheelchair 100 decreases. The wheel assembly support strut effective length 168 in the illustrated embodiment can range from six (6) inches to eighteen (18) inches. The wheel assembly support strut effective length 168 can particularly range from twelve (12) inches to sixteen (16) inches, and the wheel assembly support strut effective length 168 can more particularly equal approximately fourteen (14) inches.

In an alternate embodiment, a plate (not depicted) to which the vertical wheel assembly pivots 125 are connected is used in lieu of the offset connecting arms 128. Use of the plate simplifies the structure of wheelchair 100, which can make wheelchair 100 easier to manufacture than embodiments using the wheel assembly support struts 122. However, the use of a plate removes the ability of wheel assembly support struts 122 to pivot around wheel assembly support strut pivots 123.

In embodiments where the offset connecting arm effective length 158 is zero, the offset connecting arm 128 is effectively eliminated and the upper rotary actuators 135 are located adjacent the wheel assembly pivots 125.

The linear actuator swing angle 170 indicates the extent to which linear actuator 130 is angled. The linear actuator swing angle 170 is the angle between the linear actuator axis 172 and the motion base reference plane 174, and is measured between the offset connecting arm 128 and the linear actuator 130. The angular difference between the motion base reference plane 174 and the surface 156 indicates the tilt of the wheel assembly support struts 122 with respect to surface 156. As the linear actuator swing angle 170 approaches 0 or 180 degrees, the torque required by upper rotary actuator 135 to either hold steady or rotate the linear actuator 130 increases. In the illustrated embodiment, the linear actuator swing angle 170 can range from negative 20 (−20) degrees to 200 degrees. The linear actuator swing angle 170 can more particularly range from 20 degrees to 160 degrees. In alternate embodiments, linear actuator swing angle 170 is fixed, and can range from 10 to 90 degrees, and can particularly range from 30 to 70 degrees, and can more particularly equal approximately 55 degrees.

Although the linear actuator swing angle 170 is described in the illustrated embodiment as being the angle between the linear actuator axis 172 and the motion base reference plane 174 as measured between the offset connecting arm 128 and the linear actuator 130, this is a measurement convention used to illustrate the motion and orientation of linear actuator 130 and should not be considered restrictive in nature. Other measurement conventions may be used to describe the motion and orientation of linear actuator 130, for example, defining the swing angle as the angle between the linear actuator axis 172 and the vertical wheel assembly pivot axis 146.

Component Movements

The following section depicts example component movements of articulated wheel assemblies 120. By combining the component movements, more complicated operations are achieved. Although the example movements are generally depicted as occurring in one direction, it should be understood that the depicted articulated wheel assemblies 120 are capable of movement in at least the direction opposite to that depicted.

FIGS. 4A-4F depict the interaction between lower rotary actuator 138 and wheel 142. Movement arrow 401 is indicative of the rotation direction of wheel 142 around lower rotary actuator 138. As can be seen by the drawings, the rotation of wheel 142 by lower rotary actuator 138 results in wheel rotation axis 152 rotating around wheel pivot axis 154.

FIGS. 5A-5F depict the interaction between upper rotary actuator 135 and linear actuator 130. Movement arrow 501 is indicative of the swing direction of linear actuator 130 around upper rotary actuator 135.

Figure 6A:
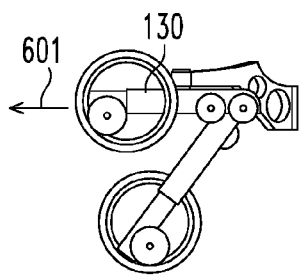
FIGS. 6A-6C are side elevational views of an articulated wheel assembly depicted in FIG. 3B.
Figure 6B:
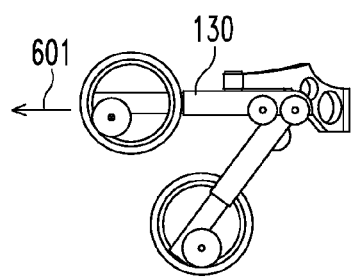
Figure 6C:
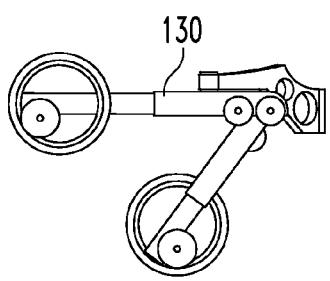
Figure 8C:
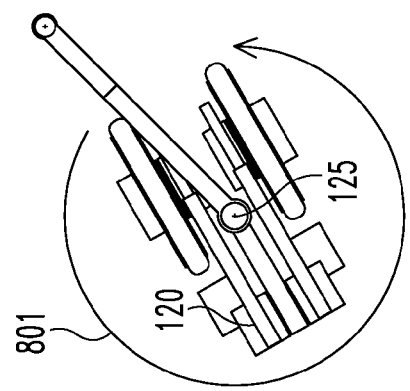
FIGS. 8A-8F are top plan views of an articulated wheel assembly depicted in FIG. 3B.
Figure 8F:
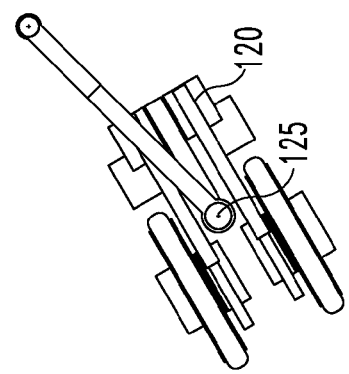
Figure 8B:
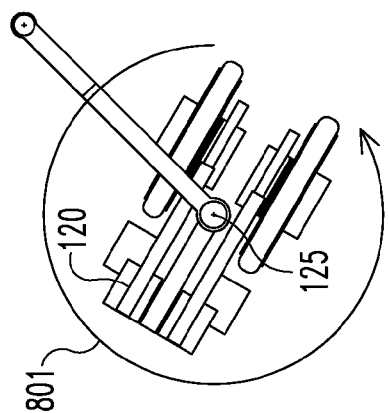
Figure 8E:
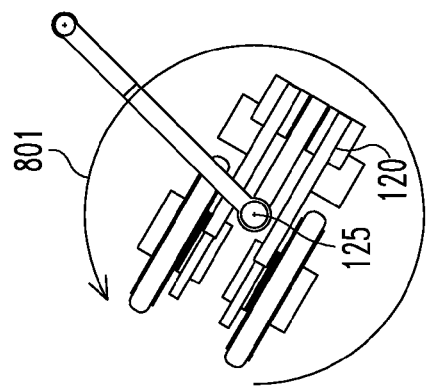
Figure 8A:
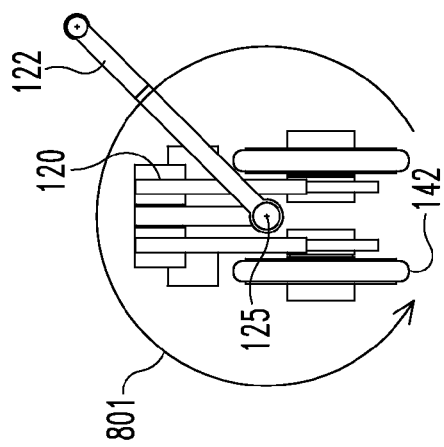
Figure 8D:
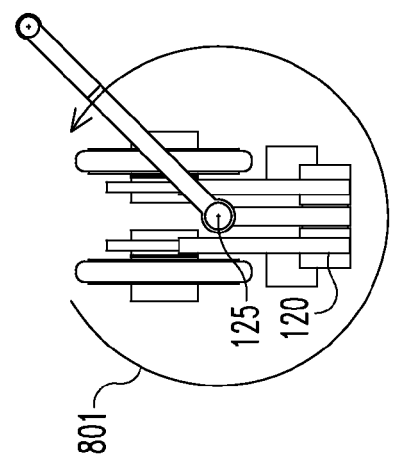
Figure 9B:
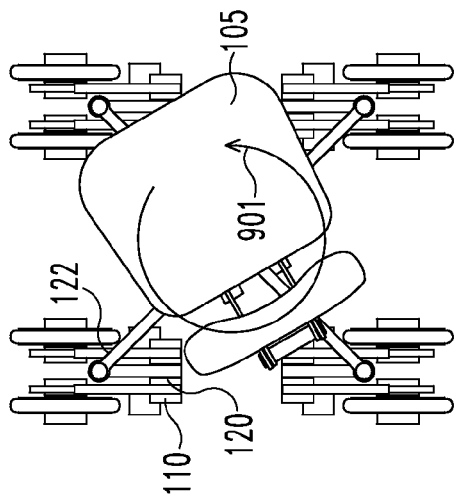
Figure 9C:
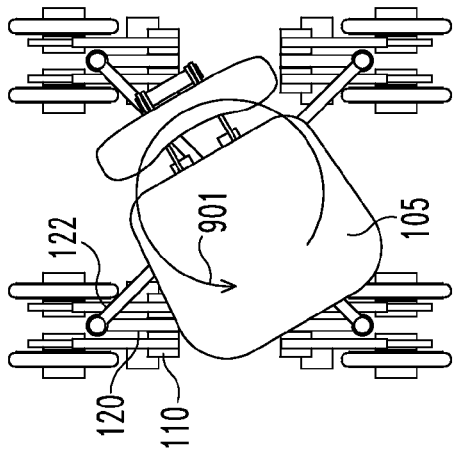
Figure 9A:
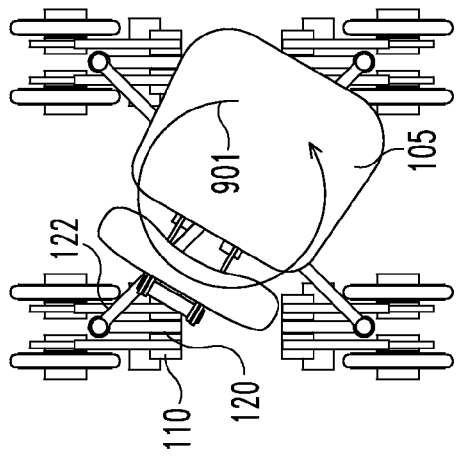
Figure 9F:
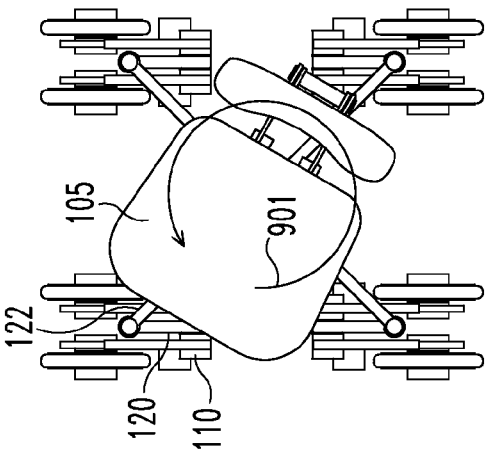
Figure 9A:
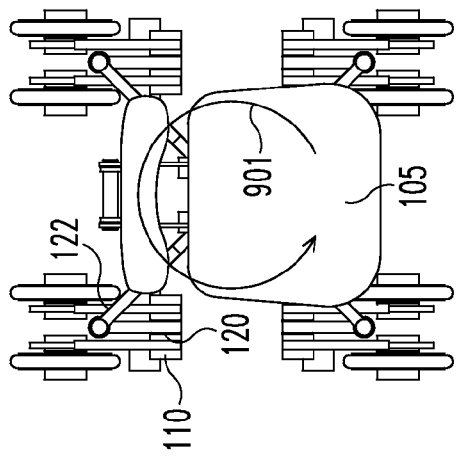
Figure 9D:
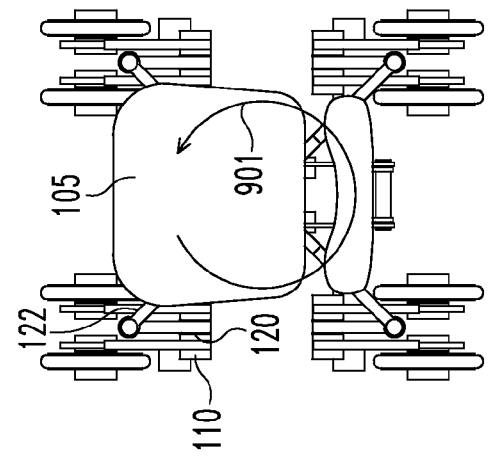
Figure 11A:
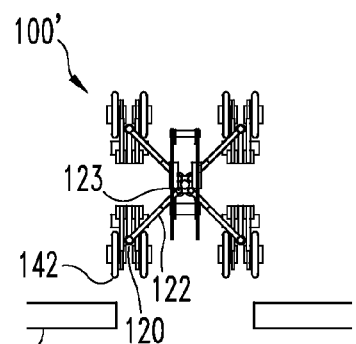
FIGS. 11A-11I are top plan views of the wheelchair, with the seat pan and back rest removed, and the articulated wheel assemblies depicted in FIG. 3B.
Figure 11B:
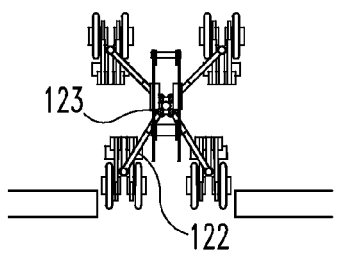
Figure 11C:
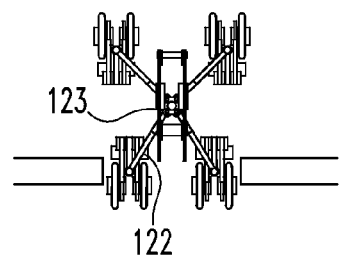
Figure 11D:
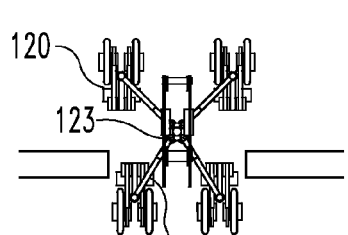
Figure 11E:
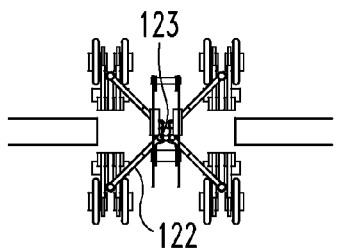
Figure 11F:
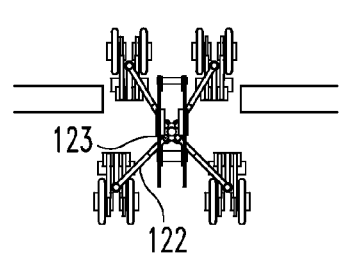
Figure 11G:
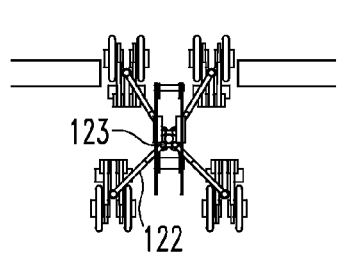
Figure 11H:
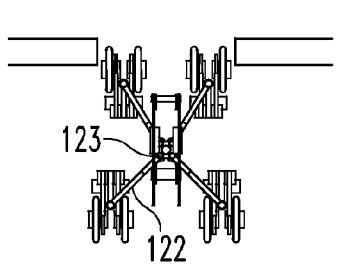
Figure 11I:
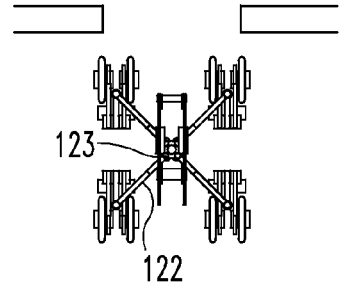

FIGS. 6A-6C depict the extension of linear actuator 130. Movement arrow 601 is indicative of the extension of linear actuator 130.

FIGS. 7A-7I depict a sequential combination of motions that are represented in FIGS. 4-6. Although these component movements are depicted as sequential, it should be appreciated that at least two of the depicted component movements may be performed simultaneously. It should be further appreciated that the depicted sequence order is not limiting, and that other sequences and sequence orders are contemplated and included. In FIGS. 7A-7C linear actuator 130 rotates forward, as indicated by movement arrow 501. Once rotation of linear actuator 130 stops, linear actuator 130 extends, then lower rotary actuator rotates wheel 142.

FIGS. 7A-7I illustrate example movements of the articulated wheel assemblies 120 that may be used to overcome various types of obstacles and terrain. Alternate embodiments use different movement sequences of the articulated wheel assemblies 120 and other components to overcome obstacles and traverse uneven terrain.

FIGS. 8A-8F depict the rotation of articulated wheel assembly 120 around vertical wheel assembly pivot 125. Movement arrow 801 is indicative of the rotation direction of articulated wheel assembly 120.

FIGS. 9A-9F depict the rotation of seat 105 with respect to the wheel assembly support struts 122. Movement arrow 901 is indicative of the rotation direction of seat 105.

Combined Component Motion Capabilities

FIGS. 10-18 depict example combined component motion sequences that may be used to overcome the depicted obstacles and terrain. These combined component motion sequences are considered exemplary in nature and are used for illustrative purposes to describe the various types of combined component motion sequences the articulated wheel assemblies 120 are capable of executing. The actual sequence of movements executed when wheelchair 100 encounters an obstacle can vary considerably depending on the specific motion strategies chosen in response to localized factors and operational considerations.

FIGS. 10A-10F depict wheelchair 100 increasing the height of seat 105 by manipulation of the articulated wheel assemblies 120. FIG. 10A depicts this seat 105 in a lower position with upper rotary actuators 135 maintaining linear actuators 130 approximately parallel to surface 156. As upper rotary actuators 135 rotate linear actuators 130 downward, the distance between seat 105 and surface 156 increases. To control the initial torque required by upper rotary actuators 135, wheels 142 are initially drawn inward with the retraction of linear actuators 130. As linear actuators 130 rotate downward, the linear actuators 130 begin to extend to increase the height of seat 105 above surface 156. To further increase the height of seat 105 above surface 156, lower rotary actuators 138 rotate wheel 142 downward.

Depicted in FIGS. 11A-11I, is wheelchair 100' (wheelchair 100 with seat pan 107 and back rest 108 removed for illustrative purposes) while moving through a narrow passageway. As wheelchair 100' approaches the narrow obstacle 1101, the forward articulated wheel assemblies 120 move close together by initially angling toward one another then realigning along the direction of travel as obstacle 1101 is approached. The inward angling of articulated wheel assemblies 120 occurs between the depictions in FIGS. 11A and 11B. In embodiments where wheel assembly support strut pivot 123 is lockable, the lock must be disengaged before wheel assembly support struts 122 may rotate. In embodiments where wheel assembly support strut pivot 123 is not lockable, wheel assembly support struts 122 rotate inward in response to the movements of articulated wheel assemblies 120. After each pair or articulated wheel assemblies 120 passes through narrow obstacle 1101, the articulated wheel assemblies 120 in each pair angle outward and increase their horizontal separation, as depicted between FIGS. 11D and 11E for the front pair of articulated wheel assemblies 120, and between FIGS. 11H and 11I for the rear pair of articulated wheel assemblies 120. After passing through narrow obstacle 1101, wheelchair 100' is substantially in the same configuration wheelchair 100' was in prior to passing through narrow obstacle 1101. In alternate embodiments, both pairs of articulated wheel assemblies 120 may narrow simultaneously when approaching a narrow obstacle 1101. In the illustrated embodiment, sensors 113 mounted on wheelchair 100' (see FIG. 3B) automatically detect the requirement to narrow the wheelbase of wheelchair 100' as wheelchair 100' approaches the narrow obstacle 1101, and the wheelchair 100' automatically narrows its wheelbase in response to this requirement. In other embodiments, the user inputs a command to wheelchair 100' to reconfigure into a configuration with a narrower wheelbase as wheelchair 100' approaches narrow obstacle 1101.

In alternate embodiments, pressure transducers located within articulated wheel assemblies 120 detect forces acting on articulated wheel assemblies 120. For example, in an alternate embodiment upper rotary actuator 135 and linear actuator motor 136 include pressure transducers to detect forces imparted to linear actuator 130 by surface 156 or various obstacles. In embodiments of the present invention, the components of articulated wheel assemblies 120 respond to these external forces, for example, linear actuator 130 retracts when encountering a force applied to linear actuator 130 by an external obstacle such as curb 1201 (FIG. 12).

FIG. 3B includes a depiction of the individual components illustrated and discussed in FIGS. 12-18, which include linear actuators 130A-130H, upper rotary actuators 135A-135H, lower rotary actuators 138A-138H, propulsion motors 140A-140H, and wheels 142A-142H.

FIGS. 12A-12I depict wheelchair 100 traversing a vertical obstacle, such as curb 1201. When traversing obstacles, for example curb 1201, the motion of the articulated wheel assemblies 120 can resemble a person "stepping" over the obstacle. As wheelchair 100 approaches curb 1201, sensors, for example infrared or ultrasonic sensors, detect the approaching curb 1201 and wheelchair 100 performs the depicted example movements to traverse curb 1201. Although two articulated wheel assemblies 120 are depicted (the forward-left and rearward-left articulated wheel assemblies 120), it should be understood that the two remaining articulated wheel assemblies 120 (the forward-right and the rearward-right articulated wheel assemblies 120) are moving in a similar fashion. Additionally, as each articulated wheel assembly 120 includes two linear actuators 130, two lower rotary actuators 138, two propulsion motors 140, and two wheels 142, the forward-outboard components are labeled with an "A," the forward-inboard components are labeled with a "B," the rear-outboard elements are labeled with a "C," and the rear-inboard components are labeled with a "D." For example, the forward-outboard linear actuator 130 is labeled actuator 130A, and the rear-outboard linear actuator 130 is labeled linear actuator 130C (see FIG. 3B).

Figure 12A:
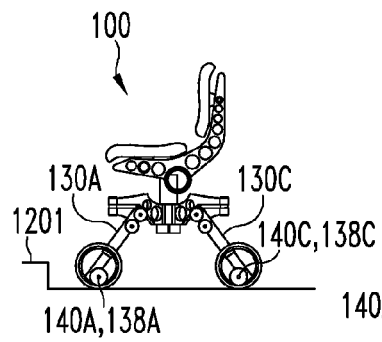
FIGS. 12A-12I are side elevational views of the wheelchair and articulated wheel assemblies depicted in FIG. 3B traversing a curb.
Figure 12B:
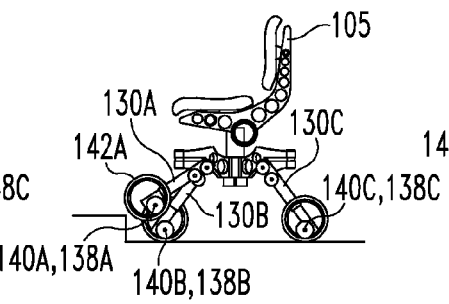
Figure 12C:
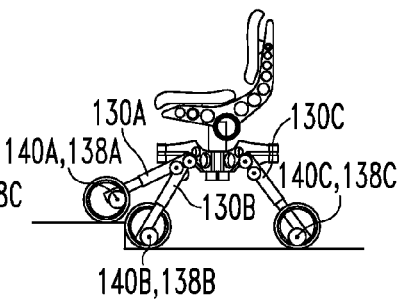
Figure 12D:
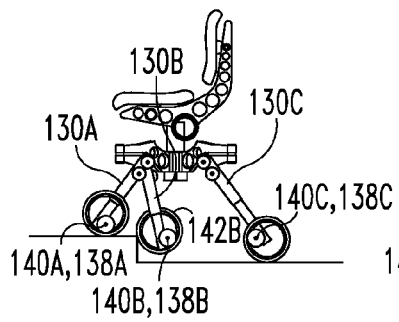
Figure 12E:
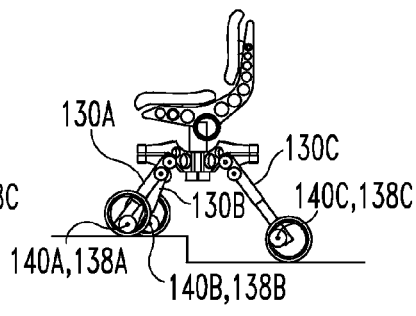
Figure 12F:
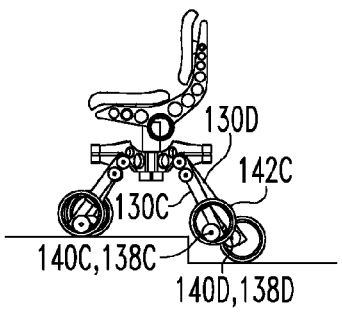
Figure 12G:
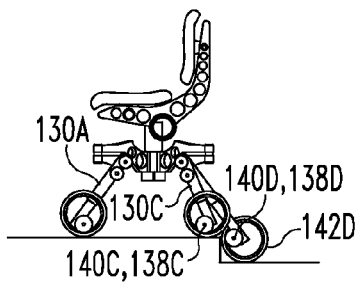
Figure 12H:
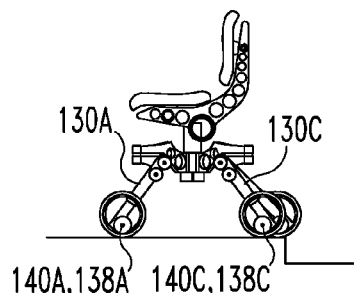
Figure 12I:
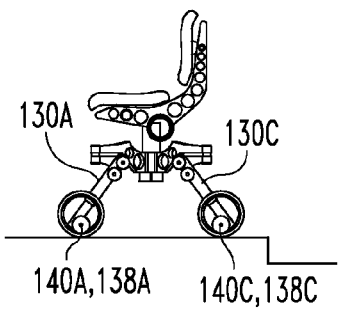

As wheelchair 100 approaches curb 1201, linear actuator 130A rotates upward and lower rotary actuator 138A rotates wheel 142A forward. Once wheel 142A is positioned on the upper surface of curb 1201, linear actuator 130B retracts, rotates rearward, and, as the wheelchair 100 continues to more forward, places wheel 142B on top of curb 1201 (FIGS. 12C and 12D). As wheelchair 100 moves onto curb 1201, seat 105 is raised and the rearward linear actuators 130C and 130D extend to maintain seat 105 level. As the rearward linear actuators 130 approach curb 1201, the rear-outboard linear actuator 130C retracts and lower rotary actuator 138C rotates wheel 142C forward. With wheel 142C on top of curb 1201, linear actuator 130D retracts and lower rotary actuator 138D rotates wheel 142D forward (FIGS. 12F-12H). Once on top of curb 1201 (FIG. 12I), wheelchair 100 returns to a configuration similar to the configuration at the beginning of the sequence (FIG. 12A).

Figures 13A, 13B, 13C:
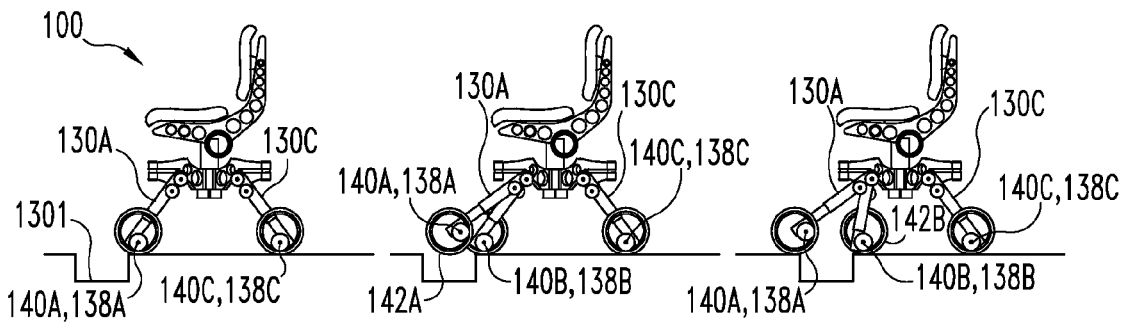
FIGS. 13A-13I are side elevational views of the wheelchair and articulated wheel assemblies depicted in FIG. 3B traversing a gap.
Figures 13D, 13E, 13F:
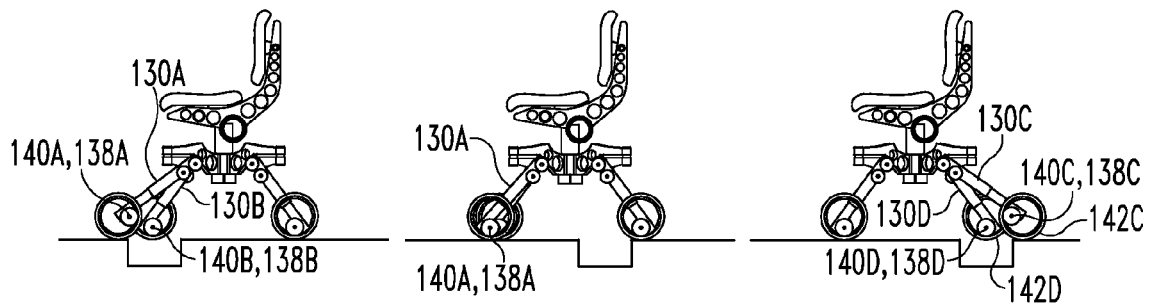
Figures 13G, 13H, 13I:
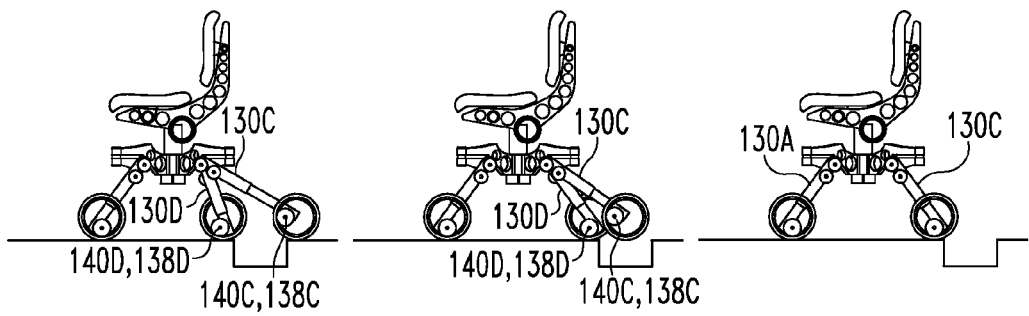

Depicted in FIGS. 13A-13I is wheelchair 100 traversing a gap 1301. As wheelchair 100 approaches gap 1301, linear actuator 130A extends and lower rotary actuator 138A rotates wheel 142A forward until wheel 142A is positioned on the other side of gap 1301 (FIGS. 13A-3C). Once wheel 142A is positioned on the other side of gap 1301, linear actuator 130B extends and rotates forward to place wheel 142B on the far side of gap 1301 (FIGS. 13C-13E). As the rear wheels approach gap 1301, linear actuator 130D retracts and rotates forward to move wheel 142D across gap 1301. As wheel 142D crosses gap 1301, linear actuator 130C extends and lower rotary actuator 138C rotates wheel 142C rearward. Once wheel 142D has traversed gap 1301, linear actuator 130C retracts and lower rotary actuator 138C rotates wheel 142C forward (FIGS. 13G-13I). After traversing gap 1301 (FIG. 13I), wheelchair 100 is configured similarly to the configuration prior to executing the illustrated sequence (FIG. 13A).

Figure 14C:
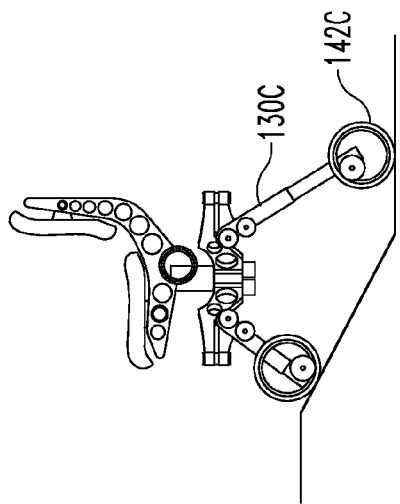
FIGS. 14A-14F are side elevational views of the wheelchair and articulated wheel assemblies depicted in FIG. 3B traversing a slope.
Figure 14B:
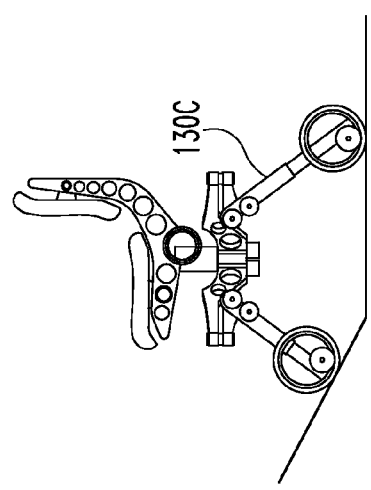
Figure 14A:
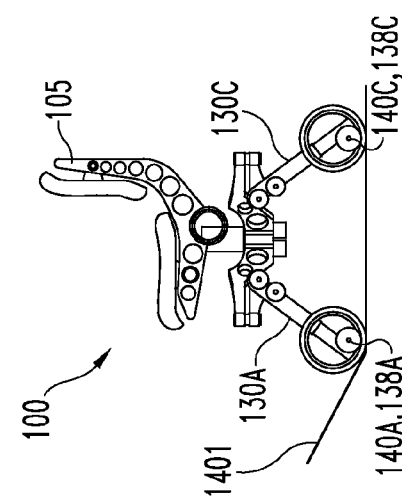
Figure 14F:
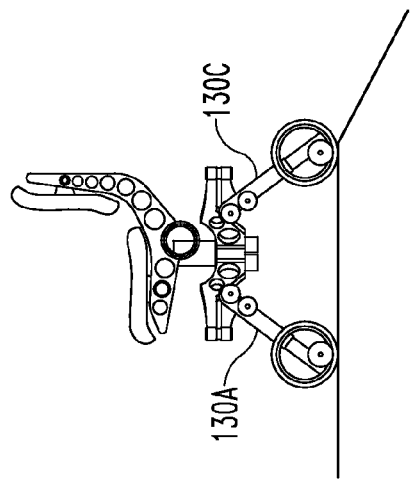
Figure 14E:
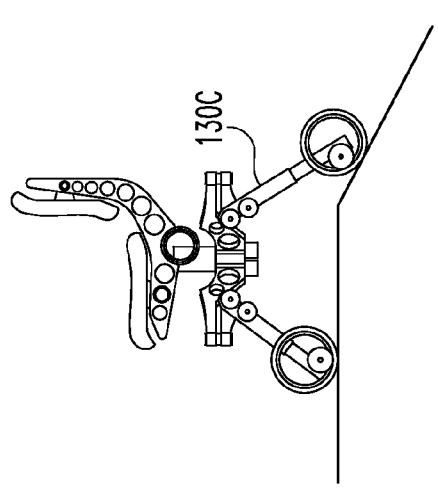
Figure 14D:
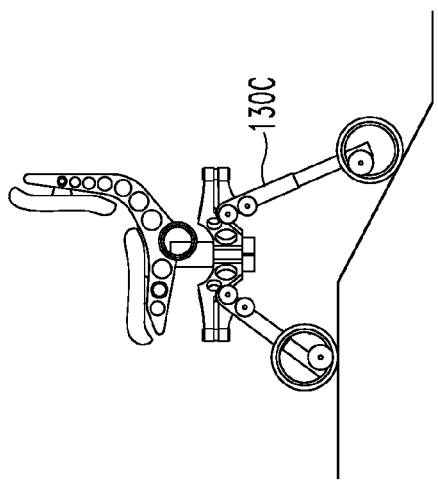

Additionally, FIGS. 14A-14F depict wheelchair 100 traversing a slope 1401. As wheelchair 100 begins up slope 1401, the forward linear actuators 130A and 130B retract while the rearward linear actuators 130C and 130D extend in order to maintain seat 105 level (FIGS. 14A-14C). The rearward lower rotary actuators 138C and 138D rotate wheels 142C and 142D downward to maintain seat 105 level. As wheelchair 100 moves beyond slope 1401 and onto a level surface, the forward linear actuators 130A and 130B extend and the rearward linear actuators 130C and 130D retract while lower rotary actuators 138C and 138D rotate wheels 142C and 142D forward (FIGS. 14D-14F). Upon completing the sequence (FIG. 14F), wheelchair 100 is in a similar configuration as when wheelchair 100 began the sequence (FIG. 14A).

FIGS. 15A-15I depict wheelchair 100 as it traverses a limited size obstacle on surface 156, for example rock 1501. As wheelchair 100 approaches rock 1501, linear actuator 130A extends and rotates forward until wheel 142A contacts rock 1501. As wheel 142A rolls over rock 1501, linear actuator 130A extends and lower rotary actuator 138A rotates wheel 142A forward (FIGS. 15A-15C). As wheel 142B contacts rock 1501, linear actuator 130B retracts and rotates rearward to maintain contact between wheel 142B and surface 156 (FIGS. 15B and 15C). As wheel 142B rotates over rock 1501, linear actuator 130B initially retracts then extends (FIGS. 15C-15E). As the rear wheels approach rock 1501, linear actuator 130D retracts and rotates forward. As wheel 142D rotates over rock 1501, linear actuator 130D initially retracts and then extends while lower rotary actuator 138D rotates wheel 142D forward as wheel 142D again comes into contact with surface 156 (FIGS. 15E-15G). Linear actuator 130C extends and rotates rearward while lower rotary actuator 138C rotates wheel 142C downward to maintain contact with surface 156 (FIGS. 15E and 15F). As wheel 142C rotates over rock 1501, linear actuator 130C initially retracts then extends as lower rotary actuator 138C rotates wheel 142C over rock 1501 (FIGS. 15F-15I).

Figures 16A, 16B, 16C:
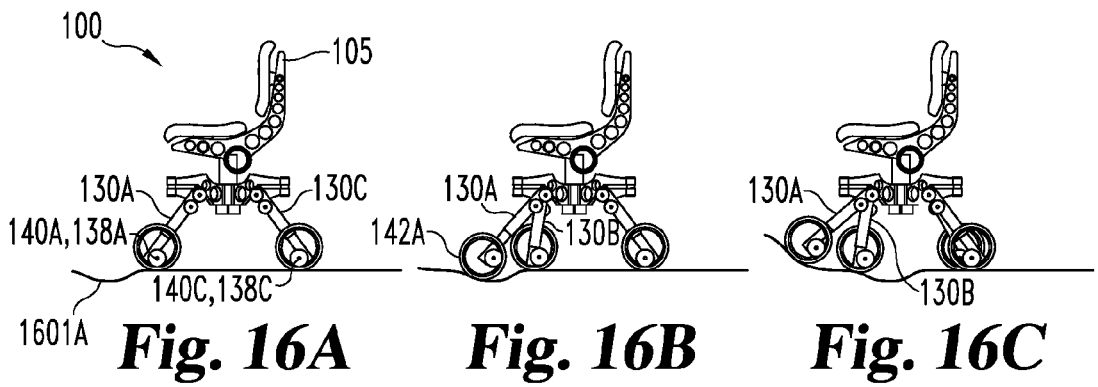
FIGS. 16A-16I are side elevational views of the wheelchair and articulated wheel assemblies depicted in FIG. 3B traversing a rough terrain obstacle.
Figures 16D, 16E, 16F:
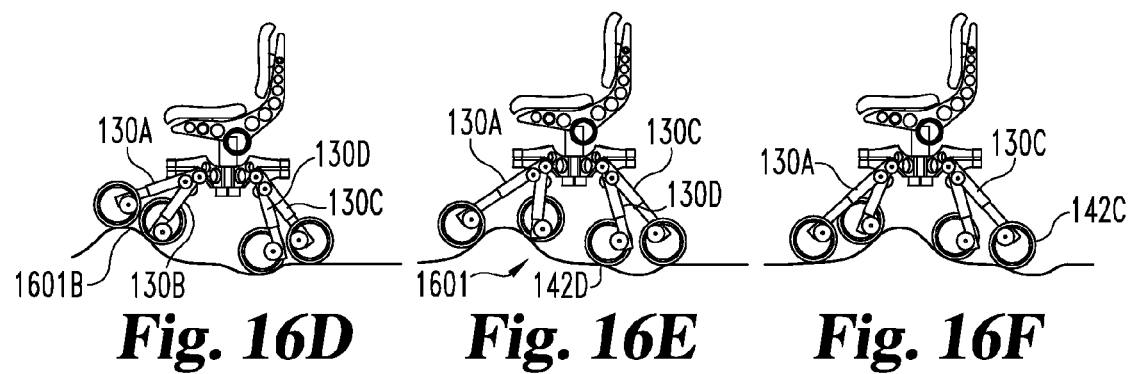
Figures 16G, 16H, 16I:
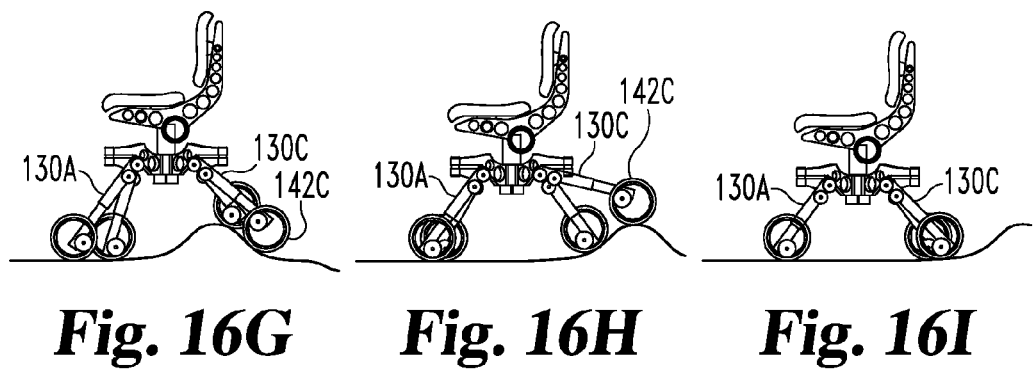

FIGS. 16A-16I depict wheelchair 100 traversing rough terrain obstacle 1601, which includes depression 1601A and bump 1601B. As wheelchair 100 traverses depression 1601A, linear actuator 130A extends and rotates forward while lower rotary actuator 138A rotates wheel 142A forward (FIGS. 16A and 16B). As wheel 142A climbs bump 1601B, linear actuator 130A rotates forward and lower rotary actuator 138A rotates wheel 142A forward. As wheel 142A travels downward after crossing the apex of bump 1601B, lower rotary actuator 138A rotates wheel 142A downward and linear actuator 130A extends further (FIGS. 16D-16F). Linear actuator 130C and 130D extend to maintain seat 105 in a level orientation as wheels 142A and 142B traverse bump 1601B (FIGS. 16D-16F). As wheel 142D traverses bump 1601B, linear actuator 130D retracts then extends. As wheel 142C traverses bump 1601B, linear actuator 130C remains extended and lower rotary actuator 138C rotates wheel 142C forward (FIGS. 16F-16I). The linear and rotary actuators move in a coordinates fashion to provide clearance for the components of wheelchair 100 and to maintain stability.

Figure 17C:
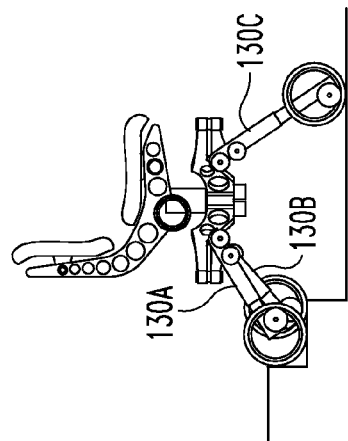
FIGS. 17A-17L are side elevational views of the wheelchair and articulated wheel assemblies depicted in FIG. 3B traversing a stairway.
Figure 17B:
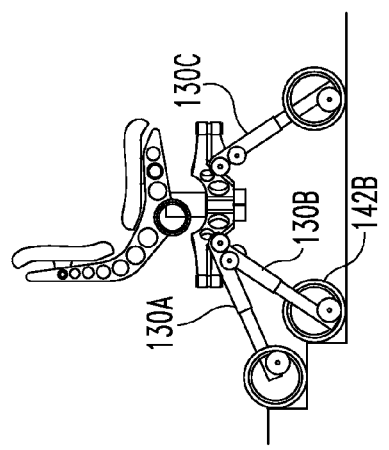
Figure 17A:
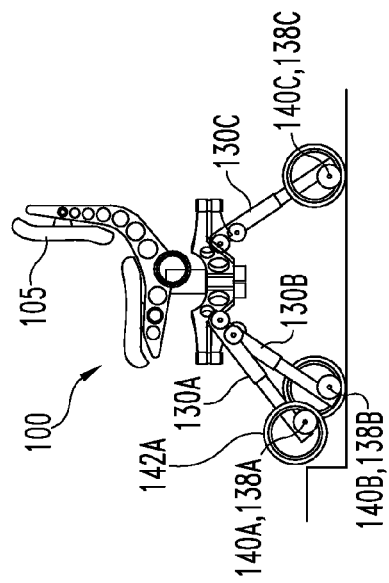
Figure 17F:
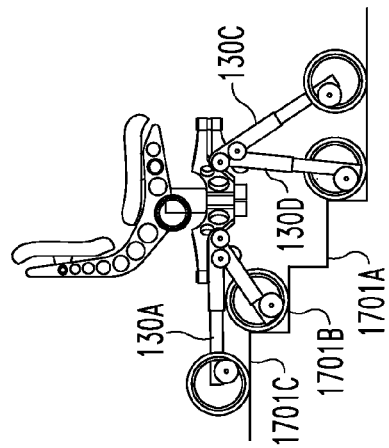
Figure 17E:
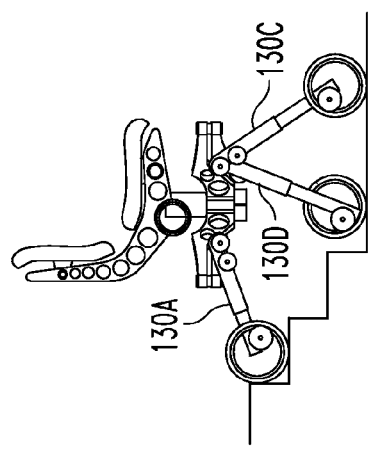
Figure 17D:
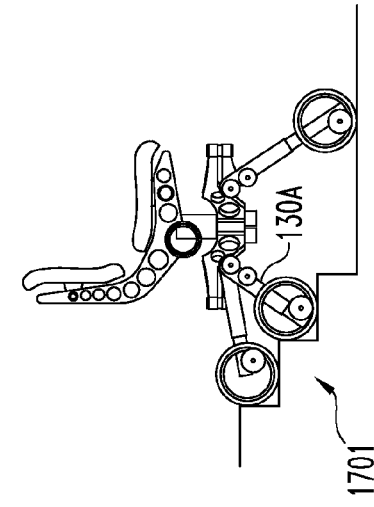
Figure 17G:
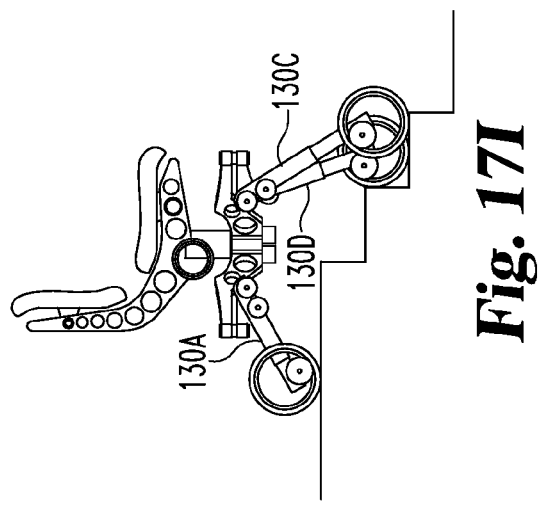
Figure 17H:
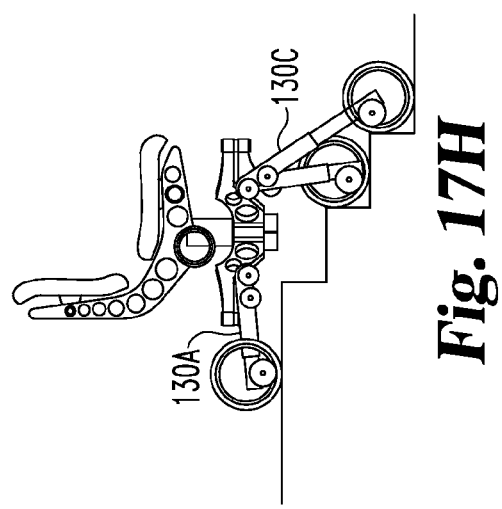
Figure 17I:
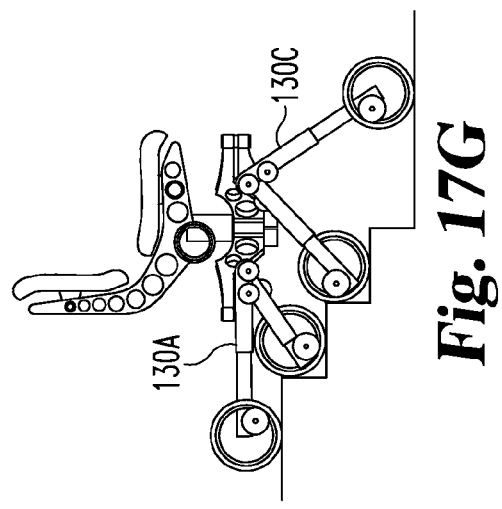
Figure 17J:
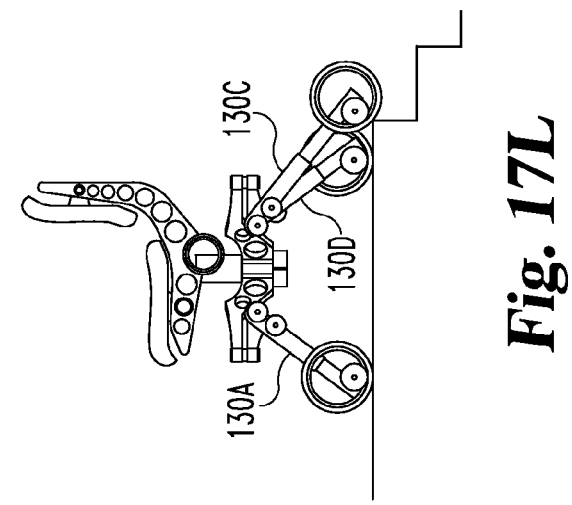
Figure 17K:
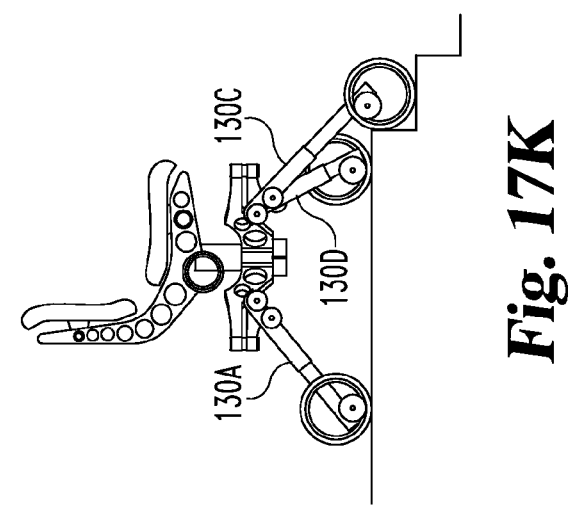
Figure 17L:
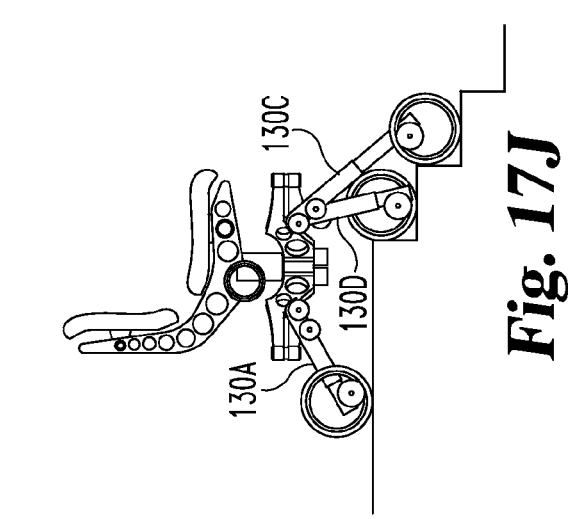

Depicted in FIGS. 17A-17F, wheelchair 100 traverses a stairway 1701, which includes first step 1701A, second step 1701B, and third step 1701C. As wheelchair 100 approaches stairway 1701, linear actuator 130A rotates forward and extends, and lower rotary actuator 138A rotates wheel 142A forward. With wheel 142A established atop first step 1701A, linear actuator 130B retracts as wheel 142B climbs first step 1701A (FIGS. 17A and 17B). Linear actuators 130C and 130D extend to maintain seat 105 in a level orientation and seat 105 rotates to face rearward to allow the user's legs to extend downward without contacting with the articulated wheel assemblies 120 (FIGS. 17A-17C). As wheelchair 100 continues up stairway 1701, linear actuator 130B rotates further forward and lower rotary actuator 138B rotates wheel 142B forward as wheel 142B rests on top of step 1701B (FIGS. 17C and 17D). As wheel 142A climbs the second step 1701B, linear actuator 130A retracts then extends (FIGS. 17D and 17E). As the rearward articulated wheel assembly 120 approaches the stairway 1701, linear actuators 130C and 130D split with linear actuator 130D rotating forward (FIGS. 17D-17F). As wheel 142A reach the top of the third step 1701C, the linear actuator 130A extends while the linear actuator 130D retracts and extends to place wheel 142D on the first step 1701A (FIGS. 17E-17G). Once wheel 142B is atop the third step 1701C, linear actuators 130A and 130B align with one another (FIGS. 17G and 17H). As the rear articulated wheel assembly 120 climbs the stairway 1701, linear actuators 130C and 130D retract and extend and lower rotary actuators 138C and 138D rotates wheels 142C and 142D as wheels 142C and 142D alternatingly climb each step in stairway 1701 (FIGS. 17H-17L).

Figure 18C:
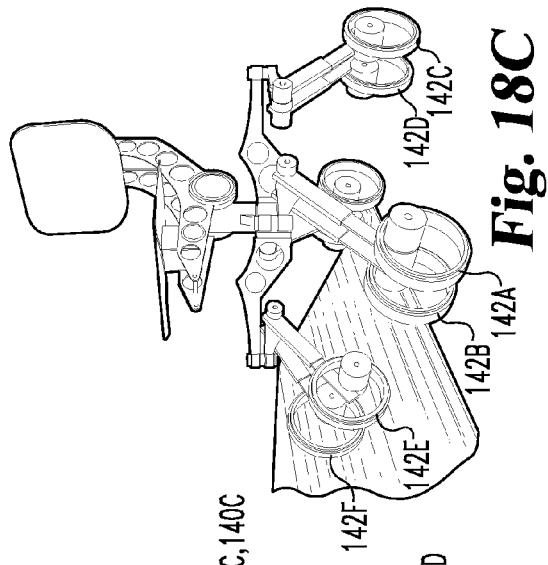
FIGS. 18A-18F are perspective views of the wheelchair and articulated wheel assemblies of FIG. 3B obliquely traversing a sloped surface.
Figure 18B:
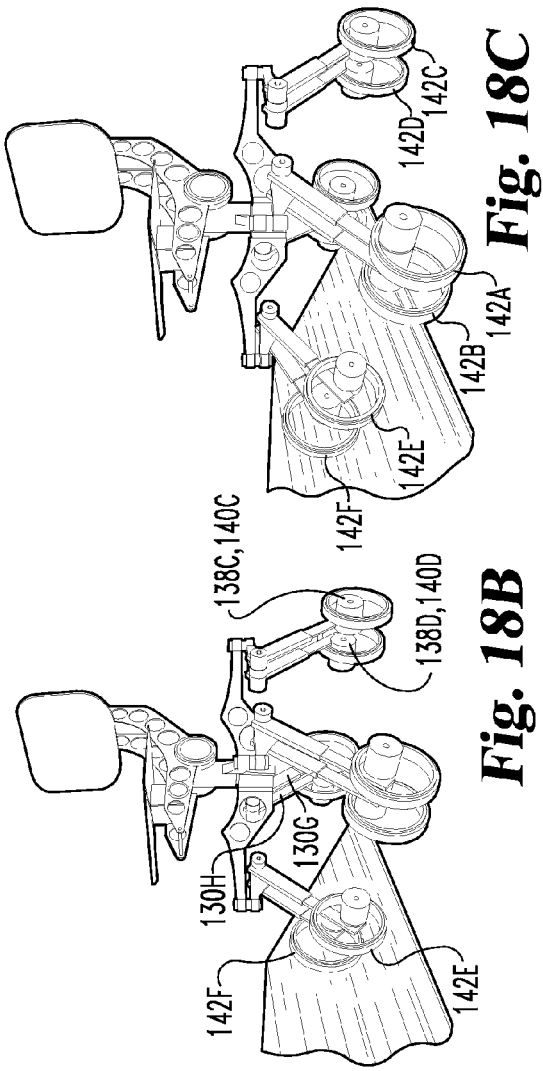
Figure 18A:
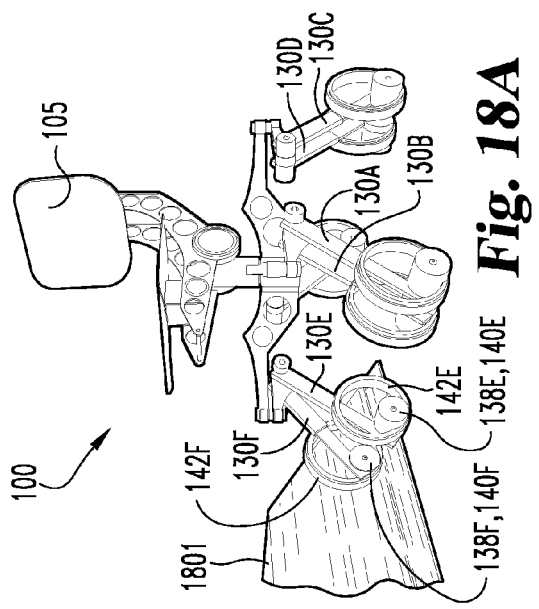
Figure 18F:
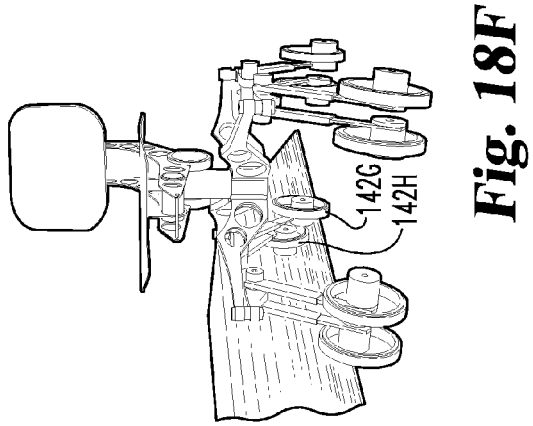
Figure 18E:
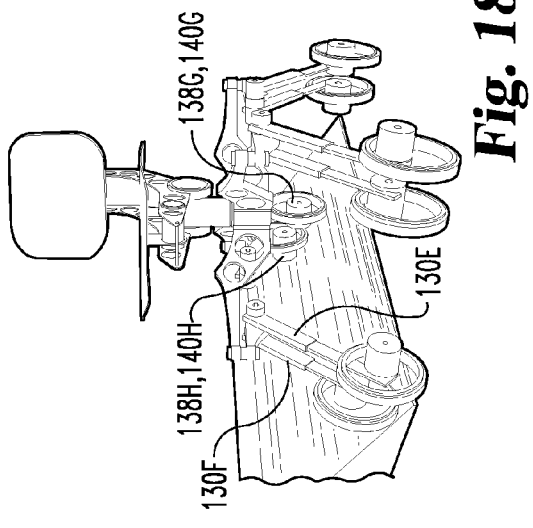
Figure 18D:
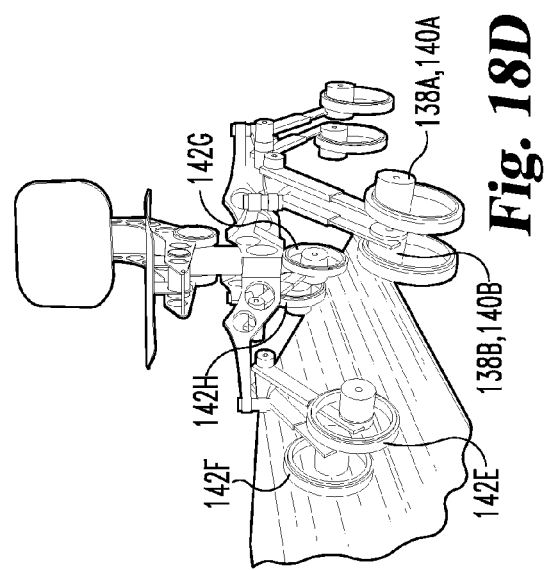

FIGS. 18A-18F depict wheelchair 100 obliquely traversing a sloped surface 1801. It should be appreciated that the movements of the articulated wheel assemblies 120 while obliquely traversing sloped surface 1801 may be somewhat similar to the movements of articulated wheel assemblies 120 when traversing slope 1401 at a perpendicular angle as depicted in FIGS. 14A-14F. As wheelchair 100 begins traversing sloped surface 1801, linear actuator 130F rotates forward and lower rotary actuator 138F rotates wheel 142F forward as wheel 142F begins to climb sloped surface 1801 (FIGS. 18A-18B). As wheel 142E begins to climb sloped surface 1801, linear actuator 130E rotates forward and lower rotary actuator 138E rotates wheel 142E forward (FIGS. 18A-18C). As wheelchair 100 obliquely traverses sloped surface 1801, the articulated wheel assemblies operate to maintain seat 105 level. As wheels 142E and 142F climb sloped surface 1801, lower rotary actuators 138A, 138B, 138C, 138D, 138G and 138H rotate their respective wheels 142 forward. Additionally, linear actuators 130A, 130B, 130C, 130D, 130G and 130H extend as wheels 142E and 142F climb sloped surface 1801. The combination of rotating the wheels 142 and extending the linear actuators 130 that are below the uppermost wheels combines to maintain seat 105 level (FIGS. 18B-18E). As wheelchair 100 turns to begin motion away from sloped surface 1801 (FIGS. 18C-18E), each of the articulated wheel assemblies 120 adjust to maintain seat 105 level and to simultaneously turn wheelchair 100. As wheelchair 100 moves off of sloped surface 1801, linear actuators 130E and 130F align (FIGS. 18E-18F).

Although FIGS. 11-17 depict wheelchair 100 traversing obstacles at approximately perpendicular angles, it should be appreciated that embodiments of wheelchair 100 are capable of traversing similar obstacles at an oblique angle.

Wheel Assembly Configurations

The following section depicts example configurations in which the articulated wheel assemblies 120 may be placed. Other motion platforms, whether designed for wheelchairs or other uses, have fixed wheel systems that have limited or no capability to be reconfigured, either statically or dynamically. As a result, their motion patterns and steering strategies are constrained by the physical layout of their mechanical components.

In contrast, the articulated wheel assembly 120 of the present invention can be dynamically altered when in motion or at rest and can be used to achieve a variety of motion patterns. For example, by manipulating the angular position and lengths of the linear actuator 130, the rotational axis of the wheels 142 can be placed at various distances from the vertical wheel assembly pivot axis 146. This capability allows the articulated wheel assembly 120 components to be reconfigured in response to a variety of motion requirements. Example articulated wheel assembly 120 configurations include: "Omnidirectional Wheel Assembly Configuration," where the rotational axis of the wheel pairs are offset from the vertical wheel assembly pivot axis 146; "Virtual Omnidirectional Wheel Assembly Configuration," where the rotational axis of the wheel pairs are aligned with the vertical wheel assembly pivot axis 146; "Rough Terrain Wheel Assembly Configuration," where the individual wheels 142 of a wheel pair no longer share a common rotational axis and are offset forward or aft of the vertical wheel assembly pivot axis 146, and "Differential Drive Wheel Assembly Configuration," where the rotational axes of the wheel pairs may be offset in any direction and at any distance from the vertical wheel assembly pivot axis 146.

The ability to assume multiple articulated wheel assembly configurations 120 allows embodiments of the current invention to negotiate multiple terrain, obstacles and motion problems using the articulated wheel assembly 120 configuration and motion pattern that provides the best solution for each unique situation. Embodiments of the present invention are able to dynamically change configurations during operation.

Omnidirectional Wheel Assembly Configuration

Omnidirectional motion is the ability to change the direction of motion of a vehicle from a first or original direction of motion (which includes being stationary, or a "null" direction) to any second or new direction of motion without requiring transition or realignment of the motion base or the articulated wheel assemblies 120 prior to the vehicle initiating movement in the new direction of motion. As an example, a vehicle not capable of omnidirectional motion, such as a passenger automobile, must spatially travel along a circular arc as it changes from an original direction of motion to a new direction of motion. In contrast, an omnidirectional vehicle can "square the corner" as it changes from an original direction of motion to a new direction of motion without following a transitional arc. When initiating movement from a stationary position, or "null" direction of motion, reorientation of the articulated wheel assemblies 120 is not required by the omnidirectional vehicle irrespective of initial wheel 142 orientation, and vehicular motion begins in the new direction when wheel 142 rotation begins.

Figure 19:
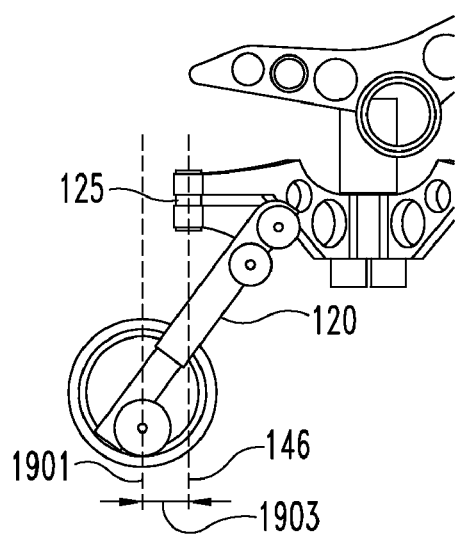
FIG. 19 is a partial side elevational view of the wheelchair and an articulated wheel assembly depicted in FIG. 3B in an omnidirectional wheel assembly configuration.

Depicted in FIG. 19 is an embodiment of the present invention with the articulated wheel assembly 120 in an omnidirectional articulated wheel assembly configuration. Omnidirectional motion can be achieved by offsetting the rotational axes of the wheel pairs from their respective vertical wheel assembly pivot axis 146 and controlling the velocities of each wheel 142 independently. The angular and translational orientation of the actuator assembly components are manipulated to align the rotational axes of the wheel 142 components of an articulated wheel assembly 120 along a common axis 1901, which is displaced a specified offset distance 1903 either forward (as depicted in FIG. 19) or aft of the wheel assembly vertical pivot axis 146. When at least two articulated wheel assemblies 120 are so configured, the motion platform may be propelled in an omnidirectional manner through the vertical wheel assembly pivots 125 by applying forces to surface 156 through wheels 142. The specified offset distance 1903 between common axis 1901 and the vertical wheel assembly pivot axis 146 may be dynamically adjusted during use to maximize performance.

As the individual wheels 142 rotate forward and/or backward, the vehicle is propelled in the new direction of motion, without requiring transition or realignment of the motion base 110 or the articulated wheel assemblies 120. Manipulation of the rotary actuators (135 and/or 138) and/or the linear actuators 130 can increase or decrease the offset distance 1903 to achieve optimum velocity and/or minimum wheel slip as dictated by localized conditions.

Figure 20:
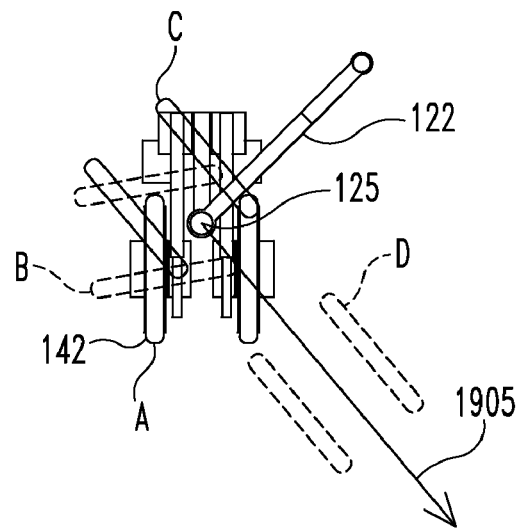
FIG. 20 is a top plan view of the articulated wheel assembly depicted in FIG. 19 depicting wheel movement.

As depicted in FIG. 20, the wheels 142 are not initially aligned with the direction of motion 1905 (alignment A). As the wheels 142 begin to move, the applied forces result in vertical wheel assembly pivot 125 moving immediately in direction of motion 1905. As depicted in orientations B and C, the wheels 142 rotate clockwise as vertical wheel assembly pivot 125 continues to travel in a straight line along direction of motion 1905.

The wheels 142 attain a condition of alignment with respect to the direction of motion 1905 while propelling the vehicle in its new direction. Once the wheel pair is fully aligned, the omnidirectional characteristics of the articulated wheel assembly 120 configuration are no longer required and the articulated wheel assemblies 120 may reconfigure into another articulated wheel assembly 120 configuration, for example, the Virtual Omnidirectional Wheel Assembly Configuration, for more efficient propulsion when traveling along relatively straight paths. For illustrative purposes, the orientation of wheel assembly support strut 122 is not depicted in orientation D.

In one embodiment of the present invention, the motion platform is configured in an Omnidirectional Wheel Assembly Configuration when motionless or at slow speeds, then transitions to a Virtual Omnidirectional Wheel Assembly Configuration (described below) when at moderate to high speeds.

Virtual-Omnidirectional Wheel Assembly Configuration

Figure 21:
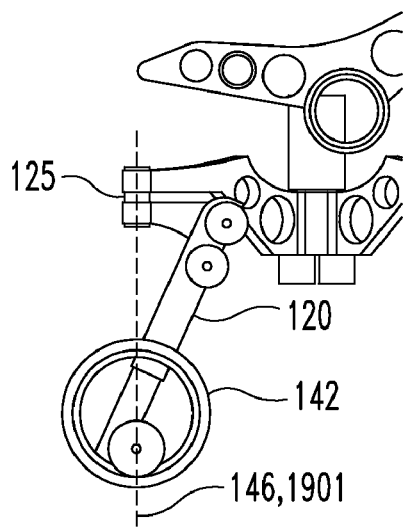
FIG. 21 is a partial side elevational view of the wheelchair and an articulated wheel assembly depicted in FIG. 3B in a virtual omnidirectional wheel assembly configuration.

FIG. 21 depicts an embodiment with the articulated wheel assembly 120 in a Virtual Omnidirectional Wheel Assembly Configuration, with common axis 1901 aligned with vertical wheel assembly pivot axis 146. In this configuration, the propulsion motors 140 steer the wheelchair 100 by applying torque to the individual wheels 142 and causing the articulated wheel assemblies 120 to rotate around vertical wheel assembly pivot axis 146. The wheel pairs continually rotate during steering maneuvers and wheel scrub is substantially reduced, increasing system efficiency. In the Virtual Omnidirectional Wheel Assembly Configuration, the articulated wheel assemblies 120 may be steered individually or in unison, and the vertical wheel assembly pivots 146 can be free to rotate or remain fixed to achieve a variety of steering strategies.

Figure 22:
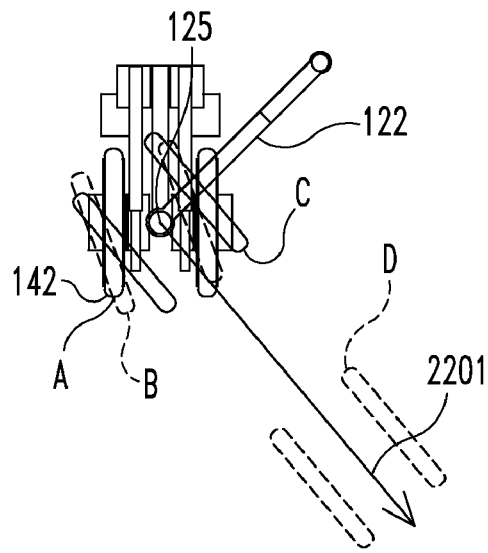
FIG. 22 is a top plan view of the articulated wheel assembly depicted in FIG. 21 depicting wheel movement.

Depicted in FIG. 22 is an illustration showing an example movement of the wheels 142 in a virtual ominidirectional wheel assembly configuration. Initially wheels 142 are aligned in orientation A.

In contrast to the Omnidirectional Wheel Assembly Configuration, the wheel pair in Virtual Omnidirectional Wheel Assembly Configuration pivots around axis 1901 (FIG. 21) and reorients itself to the direction of motion 2201 before movement is initiated (orientations B and C). By varying the relative velocities of the individual wheels 142 with the propulsion motors 140, the articulated wheel assemblies 120 rotate around the vertical wheel assembly pivot axis 146 with little or no appreciable scrubbing as they orient themselves to the direction of motion 2201. The wheels 142 then propel vertical wheel assembly pivot 125 along direction 2201 (orientation D). As wheel re-orientation occurs prior to initiation of movement in the new travel direction, the action is not considered omnidirectional. For illustrative purposes, the orientation of wheel assembly support strut 22 is not depicted in orientation D.

Although the vehicle will not immediately initiate motion if the articulated wheels 142 are misaligned with the desired direction of travel 2201, the motion patterns will resemble those achieved in Omnidirectional Wheel Assembly Configuration when traveling at typical operating velocities. Discernable differences in relative motion patterns will tend to decrease as the vehicle accelerates from a static condition.

Rough Terrain Wheel Assembly Configuration

Figure 23:
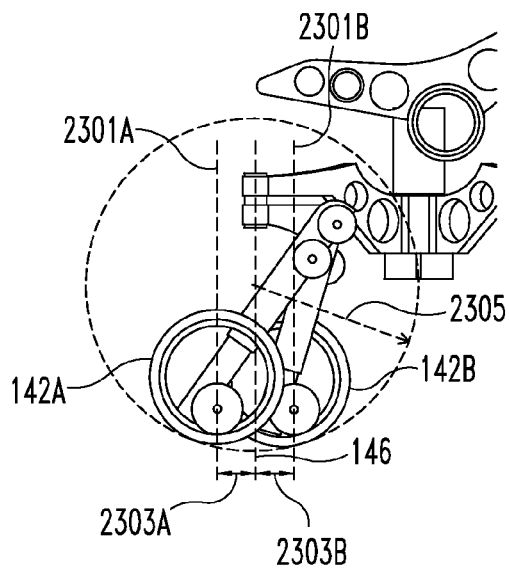
FIG. 23 is a side elevational view of the wheelchair and articulated wheel assemblies depicted in FIG. 3B in a rough terrain wheel assembly configuration.

When aligned in a Rough Terrain Wheel Assembly Configuration, as depicted in FIG. 23, the wheels 142A and 142B in each wheel pair no longer share a common axis 1901 and are each offset a distance 2303A and 2303B, respectively, from vertical wheel assembly pivot 146. In the illustrated embodiment distances 2303A and 2303B are equal, although in alternate embodiments they are not equal. In still other embodiments, wheel axes 2301A and 2301B are positioned on the same side (either fore or aft) of vertical wheel assembly pivot axis 146. The longitudinal distribution of the wheel contact area with respect to the ground plane resembles that of a larger wheel diameter, allowing the vehicle to travel over irregular terrain less accessible to motion platforms with relatively small diameter wheels. The offset distances 2303A and 2303B can be increased or decreased by manipulating the articulated wheel assembly actuators resulting in greater or lesser equivalent wheel diameter 2305 as needed.

Figure 24:
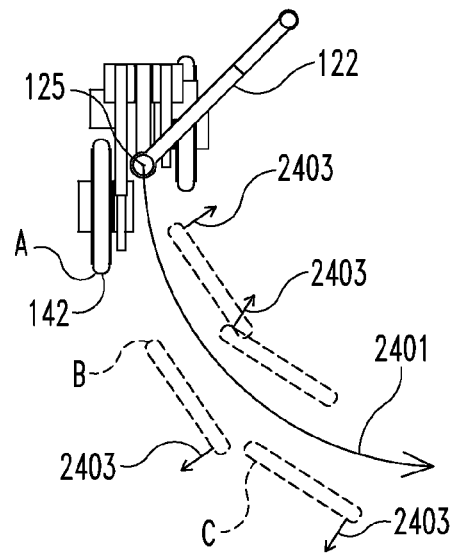
FIG. 24 is a top plan view of the articulated wheel assembly depicted in FIG. 23 depicting wheel movement.

Depicted in FIG. 24 is a representation depicting the motion of wheels 142 as vertical wheel assembly pivot 125 follows a curved direction of motion 2401. Since the wheels 142 are offset fore and aft of vertical wheel assembly pivot 125, scrubbing of the wheels occurs as vertical wheel assembly pivot 125 moves along curved path 2401. The force imparted to the wheels 142, as represented by arrows 2403, are in a direction that resists the turning of the wheel assembly.

Each articulated wheel assembly 120 acts as an independently steered drive unit, both propelling and steering the vehicle as the articulated wheel assemblies 120 rotate around their respective vertical wheel assembly pivots 125 through the forces applied at the wheels 142. Although in some embodiment this strategy superimposes a twisting moment on the individual wheels 142 by virtue of the offset distance between each wheel's contact area and its rotational axis 152, the motion platform maintains the overall characteristics of a vehicle utilizing independent, all wheel steering.

In embodiments where all vertical wheel assembly pivots 125 are locked in a unified angular orientation to prohibit rotational motion between the articulated wheel assemblies 120 and their respective wheel assembly support struts 122, forces can be applied to the wheels 142 to produce a controlled skidding motion, or skid steering. Although this configuration would not be appropriate for surfaces with high coefficients of friction, on loose terrain or terrain with low coefficients of friction, which are generally incompatible with traditional motion platforms, this configuration offers an enhanced method of travel that can provide both stability and high maneuverability.

Differential Wheel Assembly Configuration

Figure 25:
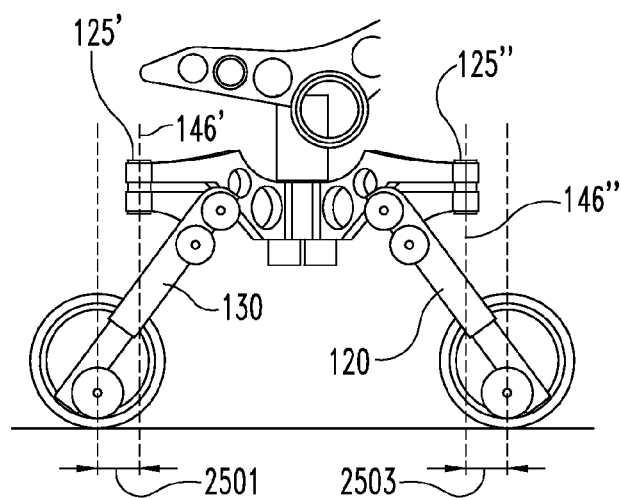
FIG. 25 is a side elevational view of the wheelchair and articulated wheel assemblies depicted in FIG. 3B in a differential wheel assembly configuration.

In a Differential Wheel Assembly Configuration as depicted in FIG. 25, motion patterns similar to those produced by many fixed-wheel vehicles can be reproduced, including front and rear wheel drive assistive devices where locomotive force is applied through laterally opposed drive components and steering motion is achieved through the application of a unique torque at each drive wheel.

In the depicted configuration, two adjacent vertical wheel assembly pivots 125 (see FIGS. 1-3) remain fixed or locked, such as by engaging or disengaging a clutch mechanism, and the remaining vertical wheel assembly pivots 125 remain free to rotate about their axes. In the depicted embodiment (an example of a front wheel drive wheelchair), the front vertical wheel assembly pivots 125' are fixed and the rear vertical wheel assembly pivots 125" are not fixed. The wheel axes of the rotatably fixed wheel assemblies are situated a common distance 2501 from vertical wheel assembly pivot axis 146' allowing them to act as fixed-drive wheels. In an alternate embodiment, the wheel axes 152 of the statically mounted articulated wheel assemblies 120 are aligned with the vertical wheel assembly pivot axis 146'. The wheel axes of the remaining two articulated wheel assemblies 120 are rotatably mounted (not fixed) and are situated a common distance 2503 from the vertical wheel assembly pivot axis 146" and are not aligned with the vertical wheel assembly pivot axis 146", allowing them to act as passive offset casters, and providing neither locomotive nor steering force to the vehicle.

In an alternate embodiment, the "free" articulated wheel assemblies 120 are forward of the "fixed" or "drive" articulated wheel assemblies 120 (rear wheel drive). In still further embodiments, the relative location of the "free" and "drive" assemblies is reconfigurable during operation in response to terrain conditions. In the differential wheel assembly configuration, the turning radius is a function of the distance between the "drive" wheel pairs.

In one embodiment, the Differential Wheel Assembly Configuration is used as a degraded or "fall back" operational configuration to provide basic movement capabilities during mechanical or control failures.

Figure 26:
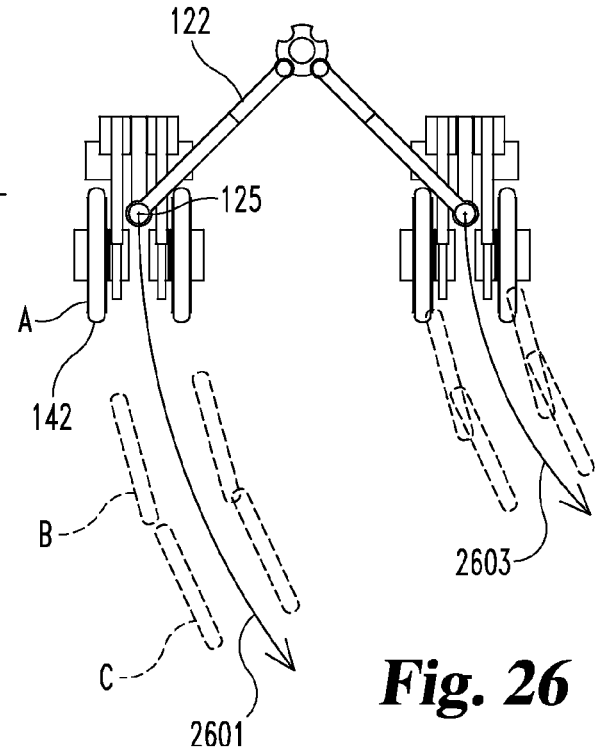
FIG. 26 is a top plan view of the articulated wheel assembly depicted in FIG. 25 depicting wheel movement.

Illustrated in FIG. 26 is a representation depicting the motion of wheels 142 as the vertical wheel assembly pivots 125 follow the curved directions of motion 2601 and 2603. Curved direction of motion 2601 depicts the path that the outboard vertical wheel assembly 125 follows, and curved direction of motion 2603 depicts the path that the inboard vertical wheel assembly 125 follows. As the wheels progress from orientations A-C, the outboard wheels 142 (following curved path 2601) travel farther than the inboard wheels (following curved path 2603). Each wheel 146 is driven at a different speed to produce the steering action and to minimize wheel scrubbing.

Motion Patterns

A feature of the present invention is the ability to transform both physically and operationally to maximize its ability to meet the challenges of a changing environment. By dynamically realigning its mechanical components, as discussed in "Wheel Assembly Configurations", and simultaneously manipulating its control, drive and steering strategies, a series of motion patterns can be produced that allow embodiments of the present invention to provide an unprecedented ability to function in diverse environments that heretofore have been considered incompatible. This ability to transition from one steering or drive mode to another contrasts with many existing vehicles that utilize static drive and steering configurations designed to address the specific motion obstacles encountered in a small set of operational conditions to the general exclusion of others, and enables embodiments of the present invention to reproduce the motion capabilities of other assistive motion platforms.

A non-exhaustive list of steering and/or drive modes that embodiments of the present invention are able to operate within and transition between include "synchronous drive/steering", "parallel all wheel drive/steering", "crab steering", "all wheel parallel steering", "Ackermann steering", "dual Ackermann steering", "pivot wheel drive", "differential drive/steering", "two wheel drive/steering", "four wheel drive/steering", "front wheel drive/steering", "rear wheel drive/steering", "mid wheel drive", "all wheel independent drive/steering", "tricycle steering" "omnidirectional drive/steering", "skid steering", and "peristaltic drive/motion".

Although these drive and/or steering modes are typically considered to be discrete, in practice many inter-relationships exist that result in a confusion of both terminology and function. As an example, the terms "differential drive" and "differential steering" are alternately used to describe the distinctive motion patterns generated when a vehicle is steered by applying unique and arbitrary torques to a pair of statically mounted drive wheels. In another case, those same terms are used to refer to a completely separate set of motion patterns exhibited when a vehicle with similar statically mounted drive wheels is steered by a second set of rotatably mounted wheels. For the sake of clarity in describing the features of the various embodiments of the present invention, the term "Motion Pattern" shall be used to describe a sequence of wheel and platform movements, or kinematic motion, produced through the implementation of a unified motion strategy. An example is the "Omnidirectional Motion Pattern" where changes in direction occur abruptly with no transitional radii connecting the first direction of motion to the second direction.

In turn, the term "Motion Strategy" is used to describe the unique combination of elements including drive modes, articulated wheel assembly 120 configurations, steering strategies, control logic, terrain characteristics, user preferences, etc. that produce a specific Motion Pattern in a specific environment under a specific set of circumstances. Motion Strategies may constantly transform in response to changing requirements and circumstances, and a unique Motion Pattern may be produced by any number of Motion Strategies. Microprocessor 104 receives inputs from various components of wheelchair 100 and processes these inputs to derive a motion strategy and produce the requisite outputs which are communicated to components of wheelchair 100. Example inputs include existing wheel position, desired velocity, battery condition, sensor data, steering position, and articulated wheel assembly configuration. Example outputs include commanded motor torques and actuator angles.

While the ability to transition from one Motion Strategy to another by reconfiguring physical and operational parameters allows a unique level of versatility, the further ability of embodiments of the present invention to do so dynamically as the vehicle travels through diverse settings, allows it to overcome the boundaries between machine and environment that heretofore have prevented users of assistive motion platforms from moving about their surroundings in an intuitive manner.

As an example of intuitive motion as provided by embodiments of the present invention, an omnidirectional motion pattern may be selected to maneuver where the need for instantaneous, low speed lateral motion is paramount, for example, in a constricted office environment. As the user moves to the out of doors, where greater distances must be traveled over paved surfaces, the vehicle reconfigures itself into a more energy efficient virtual-omnidirectional movement strategy that provides the functional advantages of omnidirectional motion patterns at higher speeds. When the need arises to travel over irregular natural terrain, the vehicle reconfigures its articulated wheel assemblies 120 for maximum traction and stability, while maintaining the maneuverability obtained with virtual omnidirectional motion patterns. Finally, when the user is confronted with an abrupt change in elevation, the vehicle transitions into climbing mode, where it utilizes the capabilities of the articulated wheel assemblies 120 to scale the obstacle without outside assistance.

FIGS. 27-30 depict a limited set of motion patterns produced by embodiments of the present invention. Although the depicted motion patterns are representative of those required to execute many motion strategies, other motion patterns may be used as required.

Omnidirectional Motion Pattern

Figure 27:
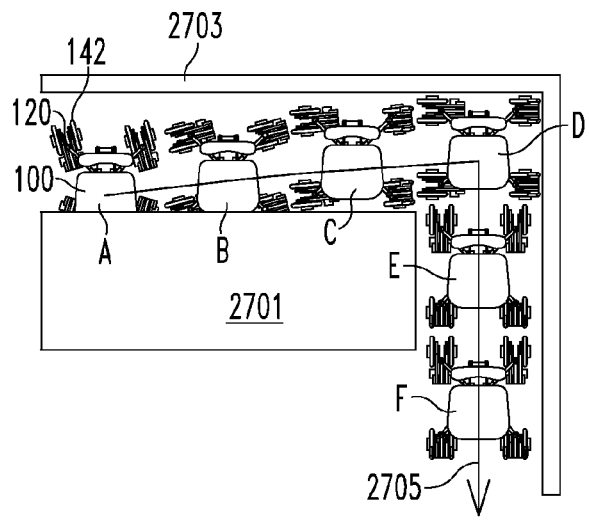
FIG. 27 is a top plan view of the wheelchair and articulated wheel assemblies depicted in FIG. 3B maneuvering using omnidirectional steering motion.

FIG. 27 depicts the sequenced movement through orientations A-F of wheelchair 100 along path 2705 according to one embodiment of the present invention using an omnidirectional motion pattern as wheelchair 100 negotiates the tight spaces between desk 2701 and wall 2703 of a simulated office floor plan. At the beginning of the sequence (orientation A), wheelchair 100 is adjacent desk 2701 with the user (not depicted) seated at desk 2701. In orientation A, the articulated wheel assemblies 120 are not aligned with the desired path 2705. With the articulated wheel assemblies 120 in the omnidirectional configuration, the wheelchair 100 immediately begins movement along path 2705 as the wheels 142 begin rotating. As wheelchair 100 travels, the articulated wheel assemblies 120 align with the direction of travel (orientations A-D). Despite being initially misaligned with the new direction of motion as wheelchair 100 travels around the corner of desk 2701 (orientation D), wheelchair 100 is able to "square" the corner without pausing to realign the articulated wheel assemblies 120, which remain in the omnidirectional configuration. After wheelchair 100 negotiates the corner of desk 2701, the articulated wheel assemblies 120 again align with the new direction of motion (orientations D-F). When initiating or changing direction, movement in the new direction is immediate and the path is direct. This ability to move in any direction closely mimics intuitive motion patterns that have previously been difficult, if not impossible, for users with typical wheelchairs to achieve. Although used to illustrate the omnidirectional motion pattern, it should be appreciated that the omnidirectional configuration may be used with other motion patterns.

Synchronous Steering Motion Pattern

Figure 28:
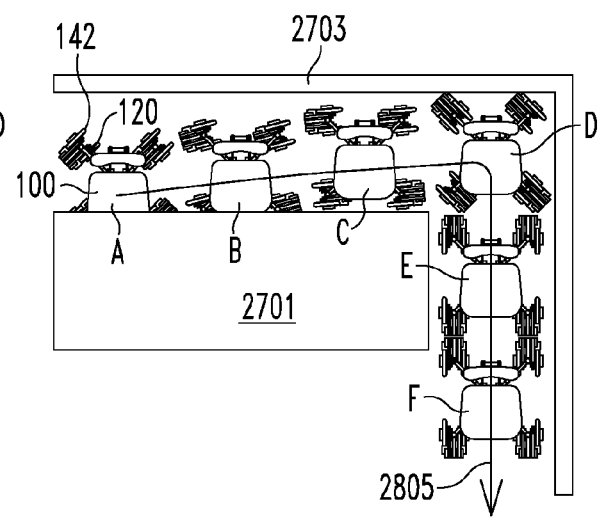
FIG. 28 is a top plan view of the wheelchair and articulated wheel assemblies depicted in FIG. 3B maneuvering using synchronized steering motion.

Driving and steering all four articulated wheel assemblies 120 in a similar fashion as though they were mechanically linked to each other produces the synchronous steering motion pattern as depicted in FIG. 28. In the illustrated example, the articulated wheel assemblies 120 are arranged in a virtual-omnidirectional wheel assembly configuration, although a synchronous steering motion pattern may be produced with other wheel assembly configurations. In orientation A, the user (not depicted) is seated at desk 2701 and the wheels 142 of articulated wheel assemblies 120 are not aligned with the desired path 2805. As such, when motion is commanded by the user, the wheel assemblies 120 rotate in unison to align wheels 142 with the desired path 2805 prior to initiation of motion along path 2805. As wheelchair 100 moves along path 2805, the wheels 142 remain aligned with the direction of motion and with one another (orientations B and C).

As wheelchair 100 negotiates around the corner of desk 2701, the wheelchair 100 "rounds" the corner to maintain forward velocity of wheelchair 100. Additionally, as wheelchair 100 turns, the motion base 110 can rotate independently from the seat 105 and does not necessarily maintain a front/back orientation in relation to the direction of motion. It should be appreciated that wheelchair 100 is capable of "squaring" the corner, although wheelchair 100 would be required to stop and allow the articulated wheel assemblies 120 to reorient to the new direction of motion in order to "square" the corner. As wheelchair 100 continues along desired path 2805 (orientations E and F), wheels 142 are aligned with the direction of motion. In the illustrated embodiment, wheel scrubbing will occur with the wheels 142 aligning themselves with a new direction of travel before motion is initiated, especially with embodiments utilizing single wheel articulated assemblies. In the depicted sequence, the seat 105 does not change its orientation as the wheelchair 100 turns. This feature can be desirable, although in other situations it may be desirable to separately rotate seat 105 to coordinate with the directional movement.

Independent All Wheel Steering Motion Pattern

Figure 29:
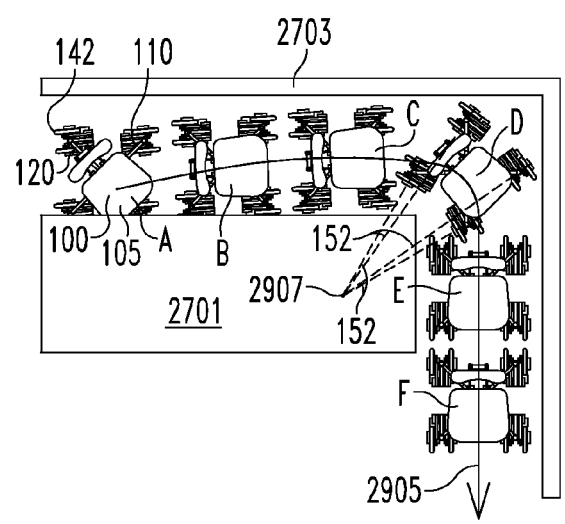
FIG. 29 is a top plan view of the wheelchair and articulated wheel assemblies depicted in FIG. 3B using independent all wheel steering.

As depicted in FIG. 29, the articulated wheel assemblies 120 are driven and steered independently to produce the independent all wheel steering motion pattern. While maneuvering with the independent all wheel steering motion pattern, the wheel rotation axes 152 intersect at the instantaneous center of rotation 2907 (depicted in orientation D) and wheel scrub is effectively eliminated. When traveling in a straight line, the wheel rotation axes 152 are parallel, the turn radius is infinite, and the instantaneous center of rotation is an infinite distance from the platform (orientations E and F). When pivoting in one location, the turn radius is zero and the instantaneous center of rotation is beneath the platform. As such, the turn radius can vary from infinity to zero, giving the wheelchair 100 a full range of maneuverability with little or no scrubbing inefficiencies.

In the illustrated sequence of FIG. 29, the articulated wheel assemblies 120 are in the virtual-omnidirectional configuration and a steering strategy is chosen to produce an independent all wheel steering motion pattern. In the depicted sequence, as the wheelchair 100 moves between orientations A and B, the seat 105 rotates to align with the direction of motion along path 2905. In contrast to the sequences depicted in FIGS. 27 and 28, as wheelchair 100 negotiates around the corner of desk 2701, the motion base 110 rotates as the wheelchair 100 turns. Although the wheelchair 100 is depicted as following a curved path 2905 between orientations A and E, it should be appreciated that wheelchair 100 is capable of "squaring" the corner of desk 2701 using an independent all wheel steering motion pattern with wheelchair 100 pivoting as it travels around the corner of desk 2701.

As each wheel pair is steered and driven independently to produce an independent all wheel steering motion pattern, this motion pattern can mimic the motion patterns produced by various other steering strategies, for example, "all wheel parallel" steering, "Ackermann" steering, "dual Ackermann" steering, "pivot wheel" steering, "differential" steering, and "tricycle" steering. In one embodiment of the present invention, the wheelchair travels in an independent all wheel steering motion pattern when traveling at speeds approximately equal to average walking speeds or faster.

Differential Steering Motion Pattern

Figure 30:
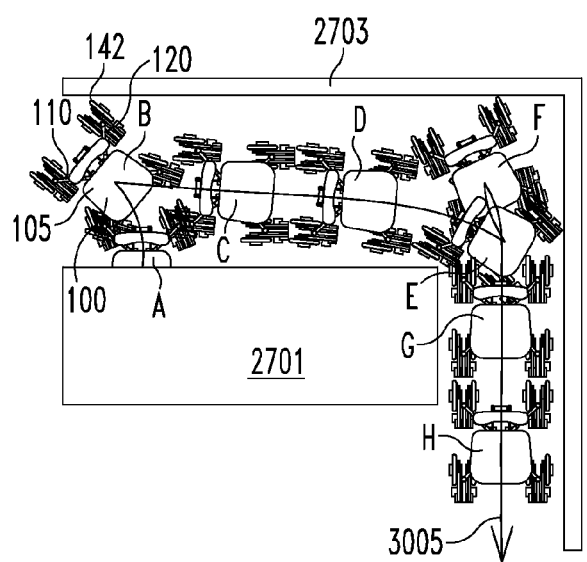
FIG. 30 is a top plan view of the wheelchair and articulated wheel assemblies depicted in FIG. 3B maneuvering using differential steering motion.

FIG. 30 depicts a wheelchair 100 maneuvering in a differential steering motion pattern (represented by orientations A-H). The illustrated sequence is required for a typical powered differential drive wheelchair or a manual wheelchair with fixed drive wheels when traveling around an obstacle in a confined space. In the illustrated embodiment, articulated wheel assemblies 120 are arranged in a differential wheel assembly configuration with the rear articulated wheel assemblies 120 "locked" and the forward articulated wheel assemblies unpowered and allowed to caster. To move the user (not depicted) from the seated position at table 2701, wheelchair 100 initially moves backward (orientations A and B). As wheelchair 100 begins to move forward (orientations B and C), the articulated wheel assemblies 120, acting as passive casters, begin to orient with the direction of travel along path 3005. In the illustrated example, wheelchair 100 cannot maneuver around the corner of table 2701 while maintaining a forward velocity, and wheelchair 100 is required to "back up" and perform a "multi-point turn" in order to maneuver around the corner of table 2701 (orientations E and F). Unlike the motion patterns depicted in FIGS. 27 and 28, the motion base 110 rotates as wheelchair 100 maneuvers around table 2701. As wheelchair 100 continues along path 3005, articulated wheel assemblies 120, acting as passive casters, align with the direction of motion (orientations G and H). The "locked" articulated wheel assemblies 120, which include the drive wheels, are aligned with the direction of motion along path 3005. The relatively wide turning radius associated with a differential steering motion pattern makes this type of motion particularly unwieldy in confined spaces. In an embodiment of the present invention, a differential steering motion pattern is used as a degraded mode of operation, which may be used when components of wheelchair 100 malfunction.

While the illustrations have depicted articulated wheel assemblies 120 with two hubless wheels 142, two propulsion motors 140, two upper rotary actuators 135, two linear actuator motors 136, and two lower rotary actuators 138, alternate embodiments include other combinations and/or configurations. Examples of such alternate embodiments, combinations and configurations are included below. For example, some embodiments include two propulsion motors 140 and two rotary wheel actuators attached to a single linear actuator 130. Still other embodiments utilize articulated wheel assemblies 120 with a single upper rotary actuator 135, a single linear actuator 130, a single lower rotary actuator 138, a single propulsion motor 140 and a single hubless wheel 142. Additionally, the depicted propulsion motors 140 and lower rotary actuators 138 may be physically separated devices, or may be combined into a single device.

Other embodiments of the present invention utilize front wheel drive, where only the front wheels are powered and the rear wheels act as passive casters, while still other embodiments utilize rear wheel drive, where only the rear wheels are powered and the front wheels act as passive casters.

Another feature of an embodiment of the present invention is derived from the ability to vary the horizontal distance between the vertical wheel assembly pivot axis 146 and the rotational axis 152 of the wheels 142. The ratio between this horizontal distance and the distance between the two wheels on each articulated wheel assembly 120 influences the overall size of the articulated wheel assembly 120 and the amount of wheel slippage that can occur during operation. Too small of a ratio can result in actuator saturation, and too large of a ratio can result in a large articulated wheel assembly 120 with associated clearance problems. The ability to vary the horizontal distance between the vertical wheel assembly pivot 146 and the propulsion motor 140 during operation provides the ability to achieve optimal performance in multiple situations.

Yet another feature present in embodiments of the present invention is derived from the placement of a linear actuator 130 between the offset connecting arm 128 and the wheel. The use of the linear actuator 130 in this fashion results in the linear actuator 130 acting as a "reverse offset link." This "double link" arrangement of the offset connecting arm 128 and the linear actuator 130 allows for dynamic adjustment of the platform height and wheelbase when combined with the upper rotary actuator. Angular adjustments in response to terrain obstacles and active suspension capabilities, while maintaining enhanced omnidirectional capabilities.

Further features of other embodiments of the present invention derive from the use of hub mounted motors. The hub mounted motors enable the lowering of the center of gravity, help distribute component weight evenly around the platform, use otherwise unused space, increase mounting opportunities, and act as attachment points for other articulated wheel assembly 120 components.

Another feature of another embodiment of the present invention is the ability to use wheels with diameters larger than those of other types of motorized multi-directional vehicles, for example ball wheels or Killough wheels. The larger diameter wheels allow for operation on rough terrain, soft surfaces and stabilize climbing operations.

Still a further feature of other embodiments of the present invention is derived from the eccentrically mounted wheel motors and rotary wheel actuators. This configuration provides the ability to rotate the wheel about the wheel's center and/or the rotary actuator's center. This combination of motions allows for a combination of articulated wheel assembly 120 extension and rotational stepping action without inhibiting forward motion when small obstacles are encountered.

Still another feature realized by other embodiments of the present invention derives from the ability of the articulated wheel assemblies 120 to achieve multiple drive configurations and operate in multiple steering modes over a wide range of terrains and operating conditions. The articulated wheel assemblies 120 are capable of making dynamic adjustments to their configuration to provide an efficient and effective drive strategy.

In an alternate embodiment of the present invention, which may be referred to as "double wheels, rigid link," each articulated wheel assembly 120 includes a pair of drive assemblies rotatably and eccentrically mounted to a single rigid link which may be pivotably or rigidly coupled to the free end of an offset wheel assembly connecting arm 128 along a common transversal axis or attachment point, which in turn is rotatably coupled to the motion base 110 through a vertical wheel assembly pivot 125.

In an alternate embodiment of the present invention, which may be referred to as "double wheels, single actuator," each articulated wheel assembly 120 includes a pair of drive assemblies rotatably and eccentrically mounted to a single linear actuator 130 which may be pivotably or rigidly coupled to the free end of an offset wheel assembly connecting arm 128 along a common transversal axis or attachment point, which in turn is rotatably coupled to a motion base 110 through a vertical wheel assembly pivot 125.

In an alternate embodiment of the present invention, which may be referred to as "single wheel, single actuator," each articulated wheel assembly 120 includes a single drive assembly rotatably and eccentrically mounted to a single linear actuator 130 which is either pivotably or rigidly coupled to the free end of an offset connecting arm 128 along a common transversal axis or attachment point.

In an alternate embodiment of the present invention, which may be referred to as "alternate payload," a vehicle, or motion platform with articulated wheel assemblies 120 is provided for transporting a non-human payload over a multiplicity of terrain and obstacle configurations. The embodiment may include a payload platform for supporting a payload and a motion base 110 statically or rotatably coupled to the payload platform, or the payload platform may be an integral member of the motion base 110. Alternately, the payload platform and the motion base 110 may be separate entities that are not part of an integrated motion platform assembly or are coupled in a non-congruent manner.

In an alternate embodiment of the present invention, which may be referred to as "changing track width," a motion base 110 is provided that includes two or more wheel assembly support struts 122 arranged in a radial symmetry around, and rotatably coupled to a central support hub 124, allowing realignment of the angular pose of the support struts 122 in the horizontal plane. One or more wheel assembly support strut pivot actuators 126 may be mechanically coupled to the support struts 122, allowing a dynamic readjustment of track width in response to changing pathway configurations.

In an alternate embodiment of the present invention, which may be referred to as "alternate payload platform," a payload platform may be movably coupled to a motion base 110, comprised of a rigid, deformed plane of varying thickness and composition that acts to provide support for three or more articulated wheel assemblies 120 that are rotatably coupled to the motion base 110 through vertical wheel assembly pivots 125.

In an alternate embodiment of the present invention, which may be referred to as "alternate motor types," each drive assembly includes a hubless or otherwise configured wheel, directly or remotely coupled to a hub motor, torque motor, ring motor, pancake motor, servo-disc motor, or other mechanical or electrical actuator and/or power transmission components capable of providing locomotive torque to the wheel components.

In accordance with a feature of the present invention, which may be referred to as "stepping action," the angular and translational orientation of an actuator assembly may be manipulated so as to place wheel rotational axes 152 of wheels 142 at various points along a plane longitudinally bisecting the actuator assembly, allowing the wheel components to replicate a stepping type action, alternately stepping onto or over obstacles or abrupt elevational changes in the pathway configuration.

In accordance with another feature of the present invention, which may be referred to as "level seat," the angular and translational orientation of the actuator assembly components may be manipulated in a dynamic fashion so as to increase or decrease the effective length of the individual articulated wheel assemblies 120 supporting the motion base 110 at a distance above the ground plane, thereby maintaining a level or otherwise optimal posture independent of changing path configurations.

In accordance with a preferred embodiment of the present invention, which may be referred to as "drive & steering configurations," a vehicle, or motion platform with two or more articulated wheel assemblies 120 is provided. Each articulated wheel assembly 120 includes two discrete drive assemblies, each with independently driven and articulated wheel systems. Each wheel system is coupled to a wheel mounted motor which provides both propulsion and steering force by applying unique torques to the opposing wheel pair. The propulsion motors 140 may act individually or in unison with any or all alternate drive assembly motors, providing a multiplicity of potential drive and steering configurations as required to produce a desired motion strategy. In a degraded condition, for example due to mechanical or electrical failure, various drive configurations may be utilized to provide emergency propulsion with remaining resources.

In accordance with still another feature of the present invention, which may be referred to as "pivoting wheel," a drive assembly is provided consisting of a hubless wheel system coupled to a discrete propulsion motor 140 and rotatably attached to an actuator whose rotational axis is eccentrically offset by a specified distance from the centrally located rotational axis of the wheel components. The eccentrically mounted rotary actuator may be a part of an actuator assembly acting as an articulated link between the drive assembly and the offset wheel assembly connecting arm. By applying a torque at the rotary actuator, the wheel components pivot in an eccentric fashion around the rotational axis of the actuator, allowing both a compressed and extended configuration as well as a compact stepping motion when operated in a coordinated manner with other components of the motion base 110.

In accordance with yet another feature of embodiments of the present invention, the angular and translational orientation of the actuator assembly components may be reconfigured so as to align the rotational axes of the individual wheel components at various points along a plane longitudinally bisecting the actuator assembly, providing a multiplicity of wheel assembly configurations.

In an alternate embodiment, two bilaterally mounted articulated wheel assemblies 120 may be aligned to allow a common axis to pass through the rotational axes of their respective wheel components. The vertical wheel assembly pivots 125 may be made fixed as with a clutch mechanism so as to inhibit rotational motion between the articulated wheel assemblies 120 and the motion base 110. The common rotational axis of the articulated wheel assemblies 120 may be placed at any arbitrary distance from a downward projection of the vertical pivot axes, allowing a torque differential applied at the opposing articulated wheel assemblies 120 to provide steering force to the vehicle by causing the motion base 110 to rotate about the midpoint of the common wheel assembly axis.

In accordance with one feature of embodiments of the present invention, the angular and translational orientation of the actuator assembly components may be manipulated in a dynamic fashion to increase or decrease the effective length of the individual articulated wheel assemblies 120 and their angle with respect to the ground plane.

In one embodiment, as the length of the actuator assembly is increased or decreased and its angle with regard to the ground plane is decreased or increased, respectively. As such, the articulated wheel assemblies 120 are manipulated to extend or contract the wheelbase of the vehicle without altering the distance between the payload platform and the ground plane, thus providing increased stability with the actuators extended and decreased vehicle length with the actuators retracted.

In an alternate embodiment, as the length of the actuator assembly is increased or decreased, its angle with regard to the ground plane is increased or decreased, respectively. As such, the articulated wheel assemblies 120 can be manipulated to increase or decrease height payload without altering the platform wheelbase, providing enhanced high reach and low reach capabilities.

In accordance with further features of the present invention, the angular and translational orientation of the actuator assembly components may be manipulated to increase or decrease the effective length of the individual articulated wheel assemblies 120 and their angle with respect to the ground plane, resulting in a lengthening or shortening of the vehicle wheelbase. Additionally, the angular orientation of the wheel assembly support struts 122 may be manipulated to increase or decrease the lateral distance between pairs of articulated wheel assemblies 120, resulting in a narrowing or widening of the vehicle track width. Both track width and wheel base can be increased when increased stability is required such as during high speed travel. Alternatively, both track width and wheel base can be decreased when increased maneuverability is required, such as during movement in confined spaces.

Some embodiments are limited to fewer features than the total number of features disclosed. These limited feature models may be useful to provide some reduced functionality for entry level models or models that are more tailored to a specific task for specialty use. For example, while embodiments depicted in the illustrations include a pivotal attachment between the extension arm and the seat support structure, other embodiments include extension arms rigidly attached to the seat support structure.

While example embodiments of the invention have been illustrated and described in detail in the drawings and foregoing description, the same is to be considered as illustrative and not restrictive in character, it being understood that only exemplary embodiments have been shown and described and that all changes and modifications that come within the spirit of the invention are desired to be protected. Dimensions, whether used explicitly or implicitly, are not intended to be limiting and may be altered as would be understood by one of ordinary skill in the art.

What is claimed is:

1. A vehicle, comprising:
   a payload platform;
   an offset link with a proximal end and a distal end, said offset link proximal end pivotally connected with a vertically aligned pivot axis to said payload platform, and said offset link distal end positioned a horizontal distance from said vertically aligned pivot axis;
   a first extendable member with a proximal end, a distal end, a first length and a first extension motor, said first extendable member proximal end pivotally connected to said offset link distal end, wherein said first extension motor changes said first length, and wherein said first length and said vertically aligned pivot axis define a first swing angle;
   a first rotating motor connected to said first extendable member and said offset link, wherein said first rotating motor rotates said first extendable member and changes said first swing angle;
   a first wheel with a first central axis, said first wheel rotatably connected to said first extendable member distal end; and
   a first drive motor coupled to said first wheel, wherein said first drive motor rotates said first wheel around said first wheel central axis.

2. The vehicle of claim 1, further comprising:
   a second extendable member with a proximal end, a distal end, a second length and a second extension motor, said second extendable member proximal end pivotally connected to said offset link distal end, wherein said second extension motor changes said second length, and wherein said second length and said vertically aligned pivot axis define a second swing angle;
   a second rotating motor connected to said second extendable member and said offset link, wherein said second rotating motor rotates said second extendable member and changes said second swing angle;
   a second wheel with a second central axis, said second wheel rotatably connected to said second extendable member distal end; and
   a second drive motor coupled to said second wheel, wherein said second drive motor rotates said second wheel around said second wheel central axis.

3. The vehicle of claim 2, wherein said first wheel and said second wheel are spaced apart six (6) inches.

4. The vehicle of claim 1, wherein said payload platform is a wheelchair and includes a seat configured to transport a person, and further includes a user control for the user to control the movement of the wheelchair.

5. The vehicle of claim 1, wherein said payload platform includes a payload support member and a support strut with a proximal end and a distal end, said support strut proximal end pivotally connected to said payload support member and said offset link pivotally connected to said support strut distal end.

6. The vehicle of claim 5, wherein said pivotal connection between the support strut proximal end and said payload support member is selectably lockable.

7. The vehicle of claim 1, further comprising a second rotating motor with a rotational axis offset a distance from said wheel central axis, said second rotating motor connected to said extendable member and said wheel, wherein said second rotating motor rotates said wheel central axis around said second rotating motor rotational axis.

8. The vehicle of claim 1, wherein said first extendable member length is at least twelve (12) inches and at most twenty-four (24) inches.

9. The vehicle of claim 1, wherein said first wheel has a diameter equal to eight (8) inches.

10. The vehicle of claim 1, wherein said offset link distal end is positioned a horizontal distance from said vertically aligned pivot axis equal to four (4) inches.

11. The vehicle of claim 1 further comprising a microprocessor for controlling said first extension motor, said first rotating motor and said first drive motor.

12. The vehicle of claim 11 further comprising a battery for providing power to said microprocessor, said first extension motor, said first rotating motor and said first drive motor.

13. A wheelchair for transporting a person across a surface, comprising:
   a seat for carrying a person; and
   an articulated wheel assembly, including:
      an offset member with a proximal end and a distal end, said proximal end pivotally connected to said seat with a vertically aligned pivot axis, said distal end positioned a horizontal distance from said vertically aligned pivot axis;
      an extendable member with a first opposing end, a second opposing end and a length, said extendable member first end connected to said offset member distal end, and said extendable member second end positioned on an opposite side of the vertical pivot axis from said offset member distal end;
      an extension motor connected to said extendable member, wherein said extension motor changes said extendable member length;
      a wheel connected to said extendable member second end; and
      a propulsion motor connected to said wheel, wherein said propulsion motor rotates said wheel.

14. The wheelchair of claim 13 comprising four articulated wheel assemblies.

15. The wheelchair of claim 13, wherein said extendable member intersects said vertically aligned pivot axis.

16. The wheelchair of claim 15, wherein the extendable member forms an angle of fifty (50) degrees with said vertically aligned pivot axis.

17. The wheelchair of claim 13, wherein said wheel is hubless.

18. A wheelchair for transporting a person across a surface, comprising:
   a seat for carrying a person; and
   an articulated wheel assembly, including:
      an offset member with a proximal end and a distal end, said proximal end pivotally connected to said seat with a vertically aligned pivot axis, said distal end positioned a horizontal distance from said vertically aligned pivot axis;
      an elongated member with a first opposing end, a second opposing end and a central axis between said first and second opposing ends, said elongated member first end connected to said offset member distal end;
      a rotating motor connected to said offset member and said elongated member, wherein said rotating motor changes the angle between said vertically aligned pivot axis and said elongated member central axis;
      a wheel connected to said elongated member second end; and
      a propulsion motor connected to said wheel, wherein said propulsion motor rotates said wheel.

19. The wheelchair of claim 18 comprising four articulated wheel assemblies.

20. The wheelchair of claim 18, wherein said wheel is hubless.

* * * * *